US007905010B2

(12) United States Patent
Yagi et al.

(10) Patent No.: US 7,905,010 B2
(45) Date of Patent: Mar. 15, 2011

(54) WIRE AND WIRE HARNESS ORDER RECEPTION AND PRODUCTION SYSTEM

(75) Inventors: Kiyoshi Yagi, Shizuoka (JP); Makoto Katsumata, Shizuoka (JP); Hitoshi Ushijima, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 1406 days.

(21) Appl. No.: 10/532,664

(22) PCT Filed: Jul. 15, 2003

(86) PCT No.: PCT/JP03/08967
§ 371 (c)(1),
(2), (4) Date: Feb. 10, 2006

(87) PCT Pub. No.: WO2004/038737
PCT Pub. Date: May 6, 2004

(65) Prior Publication Data

US 2006/0191124 A1 Aug. 31, 2006

(30) Foreign Application Priority Data

Oct. 28, 2002 (JP) ................................ 2002-312776

(51) Int. Cl.
*H01B 13/20* (2006.01)
*G06F 19/00* (2006.01)

(52) U.S. Cl. ........................................ 29/828; 700/101

(58) Field of Classification Search ................. 29/527.1, 29/527.2, 828, 825, 857, 854, 868, 876, 701, 29/747; 700/101, 99; 264/211, 165
See application file for complete search history.

(56) References Cited

U.S. PATENT DOCUMENTS 4,161,419 A 7/1979 Alia ................................ 156/51
4,276,251 A 6/1981 Bopp ............................ 264/174
5,357,439 A 10/1994 Matsuzaki et al.
7,275,317 B2 * 10/2007 Kamata et al. .................. 29/857

FOREIGN PATENT DOCUMENTS

FR 2 252 637 6/1975
(Continued)

OTHER PUBLICATIONS

Copy of European Search Report mailed Apr. 4, 2007 (3 pages).

*Primary Examiner* — John C Hong
(74) *Attorney, Agent, or Firm* — Kratz, Quintos & Hanson, LLP

(57) ABSTRACT

Provided is an order-receiving production system and so on of a wire and wiring harness, by which the cost of the wire and a product using the wire can be prevented from increasing and the resource-saving can be attained. An order-receiving production system 1 of a wiring harness includes a wire-producing department 14, a wiring harness-assembling department 15 and a production control department 16. The production control department 16 forwards a first ordered quantity data D1, second ordered quantity data D2 and third ordered quantity data D3, each data meeting the received ordered data D, to a resin-producing department 44, core wire-producing department 45 and additive-producing department 46, respectively. The departments 44, 45 and 46 produce a pellet, core wire and additive with the respective necessary amount, respectively, and send them to the wire-producing department 14. The wire-producing department 14 extrudes a mixture of the pellets and additive onto a circumference of the core wire while simultaneously mixing the pellets and additive so that the core wire is coated with the mixture, and sends the wire produced to the wiring harness-assembling department 15 for assembling a wiring harness.

10 Claims, 9 Drawing Sheets

FOREIGN PATENT DOCUMENTS

| | | |
|---|---|---|
| FR | 2 344 613 | 10/1977 |
| GB | 1 484 949 | 9/1977 |
| GB | 2 093 043 | 8/1982 |
| JP | 3-57822 | 6/1991 |
| JP | 2799925 | 4/1994 |
| JP | 2002-75088 | 3/2002 |
| JP | 2002-150859 | 5/2002 |

* cited by examiner

WIRE AND WIRE HARNESS ORDER RECEPTION AND PRODUCTION SYSTEM

TECHNICAL FIELD

The present invention relates to an order-receiving production method and system for producing a wire (i.e. an electric wire) for use in a wiring harness and so on arranged in a motor vehicle and so on as a mobile unit, an order-receiving production method and system for assembling a wiring harness with wires, and a wire-crosslinking device.

BACKGROUND ART

Various electronic devices are mounted on a motor vehicle as a mobile unit. Therefore, the motor vehicle is provided with a wiring harness for transmitting power from a power source and control signals from a computer to the electronic devices. The wiring harness includes a plurality of electric wires and connectors attached to an end of the wires.

The wire includes an electrically conductive core wire and an electrically insulating coating, which coats the core wire. The wire is a so-called coated wire. A connector includes a terminal fitting and an insulating connector housing. The terminal fitting is made of conductive sheet metal or the like. The connector housing is formed in a box-shape and receives the terminal fitting. The connector is joined to a connector in electronic equipment, thereby the wiring harness supplies necessary electric power and signals to the electronic equipment.

The wire of the wiring harness must be distinguished in terms of the size of the core wire, the material of the coating (concerning with alteration in the materials depending upon heat-resisting property), and a purpose of use. The purpose of use means, for example, an air bag, antilock brake system (ABS), control signal such as speed data, and system in a motor vehicle in which the wire is used, such as a power transmission system.

In order to distinguish the purpose of use (system) as described above, the wire of the wiring harness has been colored to various colors. Upon manufacturing a conventional wire, when the outer circumference of the core wire is extrusion-coated with an insulating synthetic resin, the wire is colored to the desired color by mixing coloring agent having the desired color into the synthetic resin.

As for the wire described above, usually, the conductor is continuously coated with the synthetic resin and a long-sized wire is produced to increase the productivity, and the number of times for changing colors is reduced as much as possible. Accordingly, usually, a long-sized wire having the same color is produced. As for a packing of the wire, usually, the packing is carried out with a large lot and a long-sized product and for example, in a stockroom of a wire company, a wire having a color which meets the demand of a customer is usually sold by the piece. A wiring harness for use in an electric circuit, in which there are many combination of colors, is used in a motor vehicle, appliance, aircraft, and electric machine.

Accordingly, in a conventional wire factory, a great deal of wires is produced per product number and stocked. Then, according to the needs of products using wires such as a wiring harness, the stoked wires are shipped to a factory of a wiring harness or the like. Therefore, in a wire factory or a wiring harness-assembling factory, a wide space is needed to stock a great deal of wires, resulting in that the time-consuming control of wires of various product numbers is inevitably required.

Further, when the wires described above is produced, a pellet of the synthetic resin for constituting the coating of a wire and an additive, such as plasticizer, to be added to the synthetic resin are conveyed from a wire maker to a compounder who mixes the pellet and the additive. The compounder first dissolves, the pellet and the additive, then mixes them and then, cures it before shipping it to the wire maker. In a wire factory, the mixture of the pellet and the additive is dissolved again, then a core wire is extrusion-coated with it. Further, the coating of the wire is crosslinked according to needs, thus the wire is produced.

Accordingly, since it takes a lot of time to produce a wire, that is, to produce a wiring harness, it is not a good way to start producing the wire after receiving an order of a wire or wiring harness. This is a reason why the wire maker produces and stocks a large amount of the wires per their product number prior to receiving an order, while anticipating an order.

A motor vehicle maker receives many different demands from the users. Electronic equipment to be mounted on the motor vehicle is varied depending on the users, resulting in that sizes of wires for use in a wiring harness and the outer color of the wires become various and that an amount of wires of a given product number to be used tends to decrease. Thus, generally, the production of the wires is required to be the production of a small amount per each of various product types.

However, if the wire is produced by the conventional method as described above, since the number of types of the wires to be produced increases, therefore a space for stocking the produced wires increases and the control of the wires becomes further time-consuming work. Moreover, since the amount of the wire of a given product number to be used decreases, period of time for stocking the wire tends to become longer. Thus, according to the conventional process for producing a wire, that is, for producing a wiring harness, the production cost tends to increase, causing increasing in the cost of the wire itself, that is, the cost of the wiring harness itself.

Furthermore, when a wire is crosslinked in the conventional wire factory, various devices for the crosslinking has been used. The device for the crosslinking includes: an enclosed box through which the wire passes; and an irradiation unit to irradiate an electron beam onto the wires which pass through the interior of the box. The box is covered with a material such as copper to prevent the electron beam from leaking out outside.

A plurality of the irradiation units are arranged in the circumferential direction of the wire and irradiate the electron beam onto the coating of the wire for its whole circumference. Thus, the coating of the wire is crosslinked for its whole circumference. A conventional device for the crosslinking tends to become large since it includes a plurality of the irradiation units.

DISCLOSURE OF INVENTION

It is therefore a first objective of the present invention to solve the above problem and to provide an order-receiving production method and system for producing a wire and a wiring harness, by which the cost of the wire and a product using the wire can be prevented from increasing and the resource-saving can be attained. It is a second objective of the present invention to provide a small-sized wire-crosslinking device.

In order to attain the first objective, the present invention is an order-receiving production method of a wire comprising the steps of:

collecting a necessary amount of pellets of synthetic resin for constituting a coating of the wire, a core wire, and an additive to be added into the synthetic resin after receiving an order of the wire; and extruding a mixture of the pellets and the additive onto the circumference of the core wire while simultaneously mixing the pellets and the additive so that the core wire is coated with the mixture, thereby producing the wire having a necessary length.

In order to attain the first objective, the present invention is characterized in that an outer surface of the wire produced is monochromatic.

In order to attain the first objective, the present invention is characterized in that the outer surface of the wire produced is colored with a desired color.

In order to attain the first objective, the present invention in claim 4 is characterized in that the wire produced is further crosslinked.

In order to attain the first objective, the present invention is an order-receiving production method of a wiring harness comprising the steps of:

collecting a necessary amount of pellets of synthetic resin for constituting a coating of the wire of the wiring harness, a core wire, and an additive to be added into the synthetic resin after receiving an order of the wiring harness;

extruding a mixture of the pellets and the additive onto the circumference of the core wire while simultaneously mixing the pellets and the additive so that the core wire is coated with the mixture, thereby producing the wire having a necessary length; and attaching specific components to the wire produced, thereby assembling the wiring harness.

In order to attain the first objective, the present invention is characterized in that an outer surface of the wire produced is monochromatic.

In order to attain the first objective, the present invention is characterized in that the outer surface of the wire produced is colored with a desired color.

In order to attain the first objective, the present invention is characterized in that the wire produced is further crosslinked.

In order to attain the first objective, the present invention is an order-receiving production system of a wire comprising:

a wire-producing department for producing the wire, a production control department for controlling the wire-producing department and receiving an order of the wire;

a first producing department for producing a pellet;

a second producing department for producing a core wire; and a third producing department for producing an additive, wherein the production control department: computes a first ordered quantity data indicating an amount of the pellet of synthetic resin for constituting a coating of the wire corresponding to the amount of the received order forwarded from an order-placing department and forwards the first ordered quantity data to the first producing department; computes a second ordered quantity data indicating an amount of the core wire corresponding to the amount of the received order forwarded from the order-placing department and forwards the second ordered quantity data to the second producing department; and computes a third ordered quantity data indicating an amount of the additive to be added to the synthetic resin corresponding to the amount of the received order forwarded from the order-placing department and forwards the third ordered quantity data to the third producing department, the first, second and third producing departments produce the pellet, core wire and additive to the amount corresponding to the first, second and third ordered quantity data, respectively, and send the produced pellet, core wire and additive, respectively, to the wire-producing department, and the wire-producing department extrudes a mixture of the pellets sent from the first producing department and the additive sent from the third producing department onto the circumference of the core wire sent from the second producing department while simultaneously mixing the pellets and the additive so that the core wire is coated with the mixture, thereby producing the wire having a necessary length.

In order to attain the first objective, the present invention is characterized in that an outer surface of the wire produced is monochromatic.

In order to attain the first objective, the present invention is characterized in that the system further comprises a coloring device for coloring the outer surface of the wire produced with a desired color.

In order to attain the first objective, the present invention is characterized in that the system further comprises a wire-crosslinking device for crosslinking the wire produced.

In order to attain the first objective, the present invention is characterized in that the wire-crosslinking device comprises:

an enclosed box including a pair of wire-guiding parts through which the wire passes;

an irradiation unit for irradiating an electron beam onto the wires which pass through the interior of the box; and a pair of rollers arranged having a distance therebetween disposed rotatably in the box, wherein the wire is guided into the box through one wire-guiding part, in the box the wire comes in contact with an outer circumferential surface of one roller located near to the one wire-guiding part and comes in contact with an outer circumferential surface of an opposite roller, and the wire again comes in contact with an outer circumferential surface of the one roller, thereby the wire is tied up to the pair of the rollers with the wire's sleeves tucked up and the wire is guided out from the box through an opposite wire-guiding part, and the irradiation unit irradiates an electron beam onto the wires situated at the center between the pair of the rollers.

In order to attain the first objective, the present invention is an order-receiving production system of a wiring harness comprising:

a wire-producing department for producing a wire;

a wiring harness-assembling department for assembling a wiring harness by using the wire produced by the wire-producing department;

a production control department for controlling the wire-producing department and the wiring harness-assembling department, and receiving an order of the wiring harness;

a first producing department for producing a pellet;

a second producing department for producing a core wire; and a third producing department for producing an additive, wherein the production control department: computes a first ordered quantity data indicating an amount of the pellet of synthetic resin for constituting a coating of the wire corresponding to the amount of the received order forwarded from an order-placing department and forwards the first ordered quantity data to the first producing department; computes a second ordered quantity data indicating an amount of the core wire corresponding to the amount of the received order forwarded from the order-placing department and forwards the second ordered quantity data to the second producing department; and computes a third ordered quantity data indicating an amount of the additive to be added to the synthetic resin corresponding to the amount of the received order forwarded from the order-placing department and forwards the third ordered quantity data to the third producing department, the first, second and third producing departments produce the pellet, core wire and additive to the amount corresponding to the first, second and third ordered quantity data, respectively, and send the produced pellet, core wire and additive, respectively, to the wire-producing department, and the wire-producing department extrudes a mixture of the pellets sent from the first producing department and the additive sent from the third producing department onto the circumference of the core wire sent from the second producing department while simultaneously mixing the pellets and the additive so that the core wire is coated with the mixture, thereby producing the wire having a necessary length, and sends the wire produced to the wiring harness-assembling department, and the wiring harness-assembling department attaches a desired component to the wire produced by the wire-producing department, thereby assembling a wiring harness.

In order to attain the first objective, the present invention is characterized in that an outer surface of the wire produced is monochromatic.

In order to attain the first objective, the present invention is characterized in that at least one of the wire-producing department and the wiring harness-assembling department comprises a coloring device for coloring the outer surface of the wire produced with a desired color.

In order to attain the first objective, the present invention is characterized in that at least one of the wire-producing department and the wiring harness-assembling department comprises a wire-crosslinking device for crosslinking the wire produced.

In order to attain the first objective, the present invention is characterized in that the wire-crosslinking device comprises:

an enclosed box including a pair of wire-guiding parts through which the wire passes;

an irradiation unit for irradiating an electron: beam onto the wires which pass through the interior of the box; and a pair of rollers arranged having a distance therebetween disposed rotatably in the box, wherein the wire is guided into the box through one wire-guiding part, in the box the wire comes in contact with an outer circumferential surface of one roller located near to the one wire-guiding part and comes in contact with an outer circumferential surface of an opposite roller, and the wire again comes in contact with an outer circumferential surface of the one roller, thereby the wire is tied up to the pair of the rollers with the wire's sleeves tucked up and the wire is guided out from the box through an opposite wire-guiding part, and the irradiation unit irradiates an electron beam onto the wires situated at the center between the pair of the rollers.

In order to attain the second objective, the present invention is a wire-crosslinking device comprising:

an enclosed box including a pair of wire-guiding parts through which the wire passes;

an irradiation unit for irradiating an electron beam onto the wires which pass through the interior of the box; and a pair of rollers arranged having a distance therebetween disposed rotatably in the box, wherein the wire is guided into the box through one wire-guiding part, in the box the wire comes in contact with an outer circumferential surface of one roller located near to the one wire-guiding part and comes in contact with an outer circumferential surface of an opposite roller, and the wire again comes in contact with an outer circumferential surface of the one roller, thereby the wire is tied up to the pair of the rollers with the wire's sleeves tucked up and the wire is guided out from the box through an opposite wire-guiding part, and the irradiation unit irradiates an electron beam onto the wires situated at the center between the pair of the rollers.

According to the invention since the mixture of the pellets and the additive is extruded onto the circumference of the core wire while simultaneously mixing the pellets and the additive so that the core wire is coated with the mixture, a period of time required to produce the wire can be shorter than that in a case in which the pellets and the additive are mixed by a compounder. Therefore, even if the wire is produced after receiving an order of the wire, the wire can be produced in a desired period of time. Further, since the wire is produced after receiving an order of the wire, an amount of the wire to be stocked in advance can be controlled.

According to the invention since an outer surface of the wire, which is produced after receiving an order of the wire, is monochromatic, therefore the production efficiency of the wire can be prevented from deteriorating and the types (i.e. types in color) of the wire to be stocked in advance can be controlled. The color of the outer surface of the wire to be produced is preferably a bright color such as white. The outer surface of the wire to be produced may be non-colored.

In this specification, “non-colored” means a state in which a coloring agent is not mixed into synthetic resin that constitutes the coating of the wire, that is, means the color of the synthetic resin itself, while “to color the wire” means to color the outer surface of the coating of the wire with a coloring agent having a desired color.

The coloring agent means a liquid substance, in which a coloring material (organic substance for use in industry) is dissolved and dispersed in water or other solvent. The organic substance described above is a dye or a pigment (mainly, organic substance and synthetic product). Sometimes, a dye is used as a pigment and a pigment is used as a dye. In this specification, as a substantial example, the coloring agent is a coloring liquid or coating material.

The coloring liquid is a liquid, in which a dye is dissolved or dispersed in a solvent. The coating material is a material, in which a pigment is dispersed in a liquid dispersion. When the outer surface of the wire is colored with a coloring liquid, the dye permeates into the coating. When the outer surface of the wire is colored with a coating material, the pigment adheres to the outer surface without permeating into the coating of the wire. In the specification, “to color the outer surface of the wire” means to dye a part of the outer surface of the wire with a dye or to coat a part of the outer surface of the wire with a pigment.

Preferably, the solvent and liquid dispersion have an affinity to the synthetic resin for constituting the coating of the wire in order to securely permeate the dye into the coating of the wire or to make the pigment securely adhere to the outer surface of the coating of the wire.

According to the present invention, the outer surface of the wire produced is colored with a desired color to obtain the wire having the desired color.

According to the present invention, the wire produced is further crosslinked so as to obtain the wire, the coating of which has a specific strength.

According to the present invention, since the mixture of the pellets and the additive is extruded onto the circumference of the core wire while simultaneously mixing the pellets and the additive so that the core wire is coated with the mixture, a period of time required to produce the wire can be shorter than that in a case in which the pellets and the additive are mixed by a compounder. Therefore, even if the wire is produced after receiving an order of the wiring harness, the wire can be produced in a desired period of time so as to assemble the wiring harness. Further, since the wire is produced after receiving an order of the wiring harness, an amount of the wire to be stocked in advance can be controlled.

The part described in this specification means a known connector, tube for a harness, protector for a harness, grommet for a harness, and clip for wiring, which are attached to the wire as mentioned above when the wiring harness is assembled.

According to the present invention, since an outer surface of the wire, which is produced after receiving an order of the wiring harness, is monochromatic, therefore the production efficiency of the wire can be prevented from deteriorating and the types (i.e. types in color) of the wire to be stocked in advance can be controlled. The color of the outer surface of the wire to be produced is preferably a bright color such as white. The outer surface of the wire to be produced may be non-colored.

According to the present invention, the outer surface of the wire produced is colored with a desired color to obtain the wire having the desired color. Then, the part is attached to the colored wire so as to assemble the wiring harness. Since the wire colored with various colors can be obtained, one wire can be distinguished from another wire, thereby preventing an error in wiring the wires from occurring.

According to the present invention, the wire produced is further crosslinked so as to obtain the wire, the coating of which has a specific strength. Therefore, the wire in the wiring harness can have a predetermined strength.

According to the present invention, the production control department forwards a first ordered quantity data indicating a necessary amount of the pellets, second ordered quantity data indicating a necessary amount of the core wire and third ordered quantity data indicating a necessary amount of the additive, each corresponding to the received order of the wire, to a first producing department, second producing department and third producing department, respectively. Therefore, after receiving the order of the wire, a necessary amount of the starting materials of the wire can securely be collected.

Further, since wire-producing department extrudes the mixture of the pellets and the additive onto the circumference of the core wire while simultaneously mixing the pellets and the additive so that the core wire is coated with the mixture, a period of time required to produce the wire can be shorter than that in a case in which the pellets and the additive are mixed by a compounder. Therefore, even if the wire is produced after receiving an order of the wire, the wire can be produced in a desired period of time. Further, since the wire is produced after receiving an order of the wire, an amount of the wire to be stocked in advance can be controlled.

According to the present invention, since an outer surface of the wire, which is produced after receiving an order of the wire, is monochromatic, therefore the production efficiency of the wire can be prevented from deteriorating and the types (i.e. types in color) of the wire to be stocked in advance can be controlled. The color of the outer surface of the wire to be produced is preferably a bright color such as white. The outer surface of the wire to be produced may be non-colored.

According to the present invention, the system further comprises a coloring device for coloring the outer surface of the wire produced with a desired color. Therefore, the wire having the desired color can be obtained.

According to the present invention, the system further comprises a crosslinking device for crosslinking the wire so as to obtain the wire, the coating of which has a specific strength.

According to the present invention, in the wire-crosslinking device, the wire is tied up to the pair of the rollers with the wire's sleeves tucked up inside the box and an electron beam is irradiated onto the wires situated at the center between the pair of the rollers. Therefore, by using only one irradiation unit, an electron beam can securely be irradiated onto both sides of the wire, that is, an electron beam can securely irradiated onto one face-side of the wire and onto an opposite face-side of the wire situated at the back side of the one face-side of the wire.

When the wire is tied up to the pair of the rollers with the wire's sleeves tucked up, preferably, the wire is guided through the upper side of one roller, then guided through the lower side of the opposite roller and then, guided again from the upper side of the opposite roller to the lower side of the one roller, thereby the wire is guided from the upper side of the one roller to the opposite wire-guiding part.

According to the present invention, the production control department forwards a first ordered quantity data indicating a necessary amount of the pellets, second ordered quantity data indicating a necessary amount of the core wire and third ordered quantity data indicating a necessary amount of the additive, each corresponding to the received order of the wire, to a first producing department; second producing department and third producing department, respectively. Therefore, after receiving the order of the wire, a necessary amount of the starting materials of the wire can securely be gathered.

Further, since wire-producing department extrudes the mixture of the pellets and the additive onto the circumference of the core wire while simultaneously mixing the pellets and the additive so that the core wire is coated with the mixture, a period of time required to produce the wire can be shorter than that in a case in which the pellets and the additive are mixed by a compounder. The wiring harness-assembling department attaches a desired component to the wire produced by the wire-producing department, thereby assembling a wiring harness.

Therefore, even if the wire is produced after receiving an order of the wiring harness, the wire can be produced in a desired period of time so as to assemble the wiring harness. Further, since the wire is produced after receiving an order of the wiring harness, an amount of the wire to be stocked in advance can be controlled.

According to the present invention, since an outer surface of the wire, which is produced after receiving an order of the wiring harness, is monochromatic, therefore the production efficiency of the wire can be prevented from deteriorating and the types (i.e. types in color) of the wire to be stocked in advance can be controlled. The color of the outer surface of the wire to be produced is preferably a bright color such as white. The outer surface of the wire to be produced may be non-colored.

According to the present invention, at least one of the wire-producing department and the wiring harness-assembling department comprises a coloring device for coloring the outer surface of the wire produced with a desired color. Therefore, the wire having the desired color can be obtained. Then, the part is attached to the colored wire so as to assemble the wiring harness. Since the wire colored with various colors can be obtained, one wire can be distinguished from another wire, thereby preventing an error in wiring the wires from occurring.

According to the present invention, the system further comprises a crosslinking device for crosslinking the wire so as to obtain the wire, the coating of which has a specific strength. Therefore, the wire in the wiring harness can have a predetermined strength.

According to the present invention, in the wire-crosslinking device, the wire is tied up to the pair of the rollers with the wire's sleeves tucked up inside the box and an electron beam is irradiated onto the wires situated at the center between the pair of the rollers. Therefore, by using only one irradiation unit, an electron beam can securely be irradiated onto both sides of the wire.

When the wire is tied up to the pair of the rollers with the wire's sleeves tucked up, preferably, the wire is guided through the upper side of one roller, then guided through the lower side of the opposite roller and then, guided from the upper side of the opposite roller to the lower side of the one roller, thereby the wire is guided from the upper side of the one roller to the opposite wire-guiding part.

According to the present invention, in the wire-crosslinking device, the wire is tied up to the pair of the rollers with the wire's sleeves tucked up inside the box and an electron beam is irradiated onto the wires situated at the center between the pair of the rollers. Therefore, by using only one irradiation unit, an electron beam can securely be irradiated onto both sides of the wire.

When the wire is tied up to the pair of the rollers with the wire's sleeves tucked up, preferably, the wire is guided through the upper side of one roller, then guided through the lower side of the opposite roller and then, guided again from the upper side of the opposite roller to the lower side of the one roller, thereby the wire is guided from the upper side of the one roller to the opposite wire-guiding part.

BEST MODE FOR CARRYING OUT THE INVENTION

In the following, a preferred embodiment of the present invention will be explained with reference to FIGS. 1-9. An order-receiving production system 1 (shown in FIG. 1) of a wiring harness according to the preferred embodiment of the present invention produces an electric wire 2 shown in FIG. 4 and assembles a wiring harness 3 shown in FIG. 5.

Figure 4:
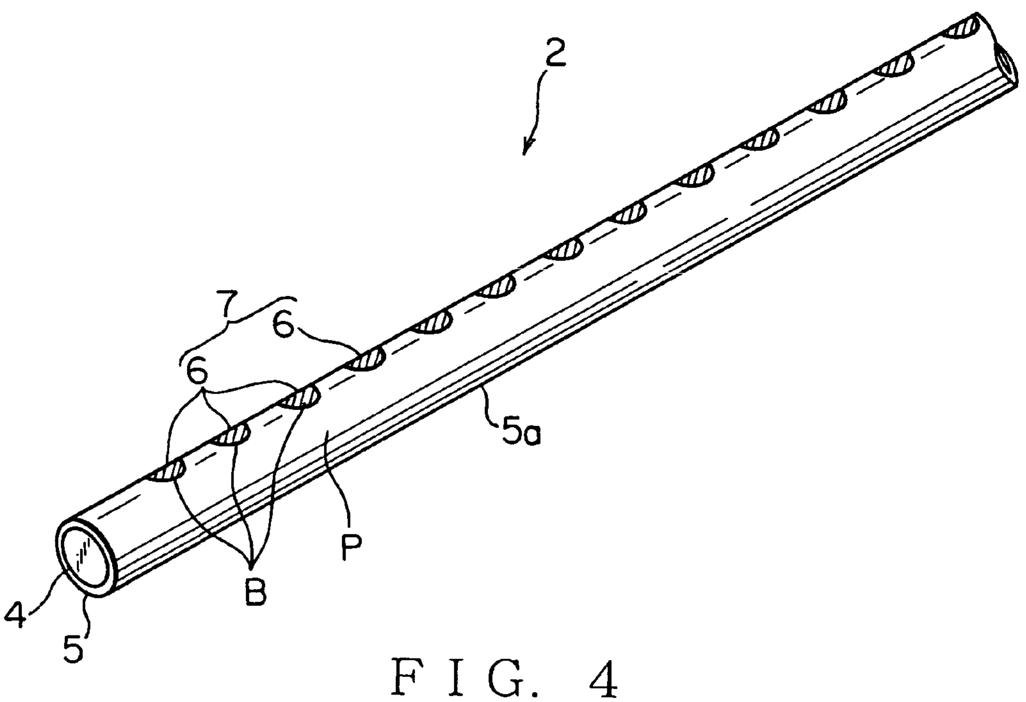
FIG. 4 is a perspective view illustrating an example of a wire produced in a wire-producing section in the order-receiving production system of a wiring harness shown in FIG. 1.

The wires 2 constitute the wiring harness 3. As shown in FIG. 4, the wire 2 includes an electrically conductive core wire 4 and an insulating coating 5. The core wire 4 consists of a plurality of element wires twisted together. The element wire is made of conductive metal. The core wire 4 may consist of a single element wire.

The coating 5 is made of synthetic resin such as polyvinyl chloride (PVC). The core wire 4 is coated with the coating 5. Therefore, an outer surface 5*a* of the coating 5 is an outer surface of the wire 2. The outer surface 5*a* of the coating 5 is monochromatic with color P (hereinafter, monochrome P). A desired coloring agent such as a white coloring agent may be added to the synthetic resin of the coating 5 so as to make the outer surface 5*a* of the wire 2 monochromatic with color P or, alternatively, a coloring agent may not be added to the synthetic resin of the coating 5 so as to make the monochrome P be a color of the synthetic resin itself.

When the monochrome P is the color of the synthetic resin itself, the outer surface 5*a* of the wire 2 is called non-coloring in this specification. Therefore, in the present invention, the outer surface 5*a* of the wire 2 may be set non-coloring.

The outer surface 5*a* of the wire 2 is provided with a mark 7 consisting of a plurality of spots 6. The spot 6 has a color B (shown by parallel diagonal lines in FIG. 4). The color B is different from the monochrome P. The shape of the spot 6 is round. A plurality of spots 6 are provided and arranged in the longitudinal direction of the wire 2 according to a predetermined pattern. The distance between the centers of the adjacent spots 6 is predetermined. The diameter of the spot 6 is also predetermined. The distance, diameter and color B described above constitute a marking pattern on the outer surface 5*a* of the wire 2.

The wire 2 of one product number is different from the wire 2 of another product number in terms of an outer diameter (hereinafter, wire diameter) of the core wire 4 and material of the coating. Further, The wire 2 of one product number is different from the wire 2 of another product number in terms of a pattern of the spots 6 to be formed on the outer surface 5*a* of the coating 5, that is a marking pattern of the outer surface 5*a* of the wire 2. Thus, the product number of the wire 2 indicates the diameter of the core wire 4, i.e. of the wire 2, the material of the coating 5, and the marking pattern. Therefore, if the product numbers of two wires 2 are different from each other, at least one of the outer diameter, wire diameter and marking pattern is different from each other.

The color B of the marking pattern, i.e. of each spot 6 of the mark 7 is changed to various colors, thereby enabling to distinguish between the wires 2. The color B of each spot 6 of the mark 7 is used to distinguish the types of the wire 2 of the wiring harness 3 and the systems to be used. That is, the color B of the outer surface 5*a* of the wire 2 obtained by the coloring is used to distinguish the purpose for use of the wire 2 of the wiring harness 3.

A copper wire thicker than an element wire is formed thin by using a known die, thereby obtaining the element wire described above. The element wires are twisted with each other, thereby obtaining the core wire 4, and synthetic resin or the like is extrusion-coated around the core wire 4, thereby obtaining the wire 2. At this time, granular pellets consisting of synthetic resin and the powdered or liquid additive such as a known plasticizer are mixed under heating. Then, the pellet melts, and the synthetic resin and the additive are well mixed with each other, and then it is extrusion-coated around the core wire 4. Then, the coating 5 is cooled down, thereby the wire is produced.

Figure 5:
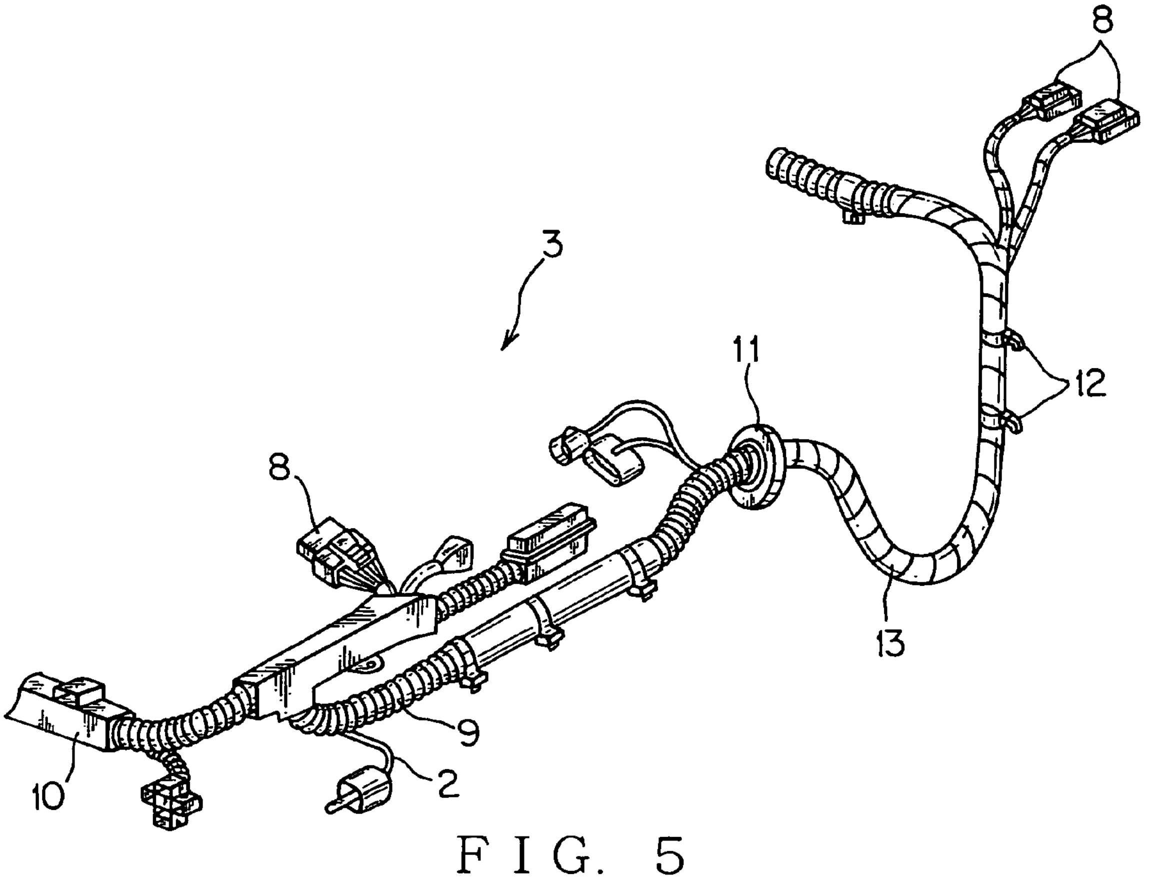
FIG. 5 is a perspective view illustrating an example of an wiring harness assembled in a wiring harness-assembling section in the order-receiving production system of a wiring harness shown in FIG. 1.

In the wiring harness 3 as shown in FIG. 5, a plurality of thus constituted wire 2 are bundled up, and a connector 8, tube 9 for a harness, protector 10 for a harness, grommet 11 for a harness, clip 12 for wiring and so on are mounted to specific portions of the wire 2, and a tape 13 for a harness is wound up around specific portions of the wire 2, thereby constructing the wiring harness 3. The connector 8 is connected with a connector of various electronic equipment in a motor vehicle, thereby the wiring harness 3 is arranged in various devices such as a motor vehicle.

The wiring harness 3 (i.e. wires 2) transmits various signals and electric power to various electronic equipment to be mounted on a motor vehicle and so on. The connector 8, tube 9 for a harness, protector 10 for a harness, grommet 11 for a harness, clip 12 for wiring are components described in this specification. The wiring harness 3 is a product using the wire 2.

Figure 1:
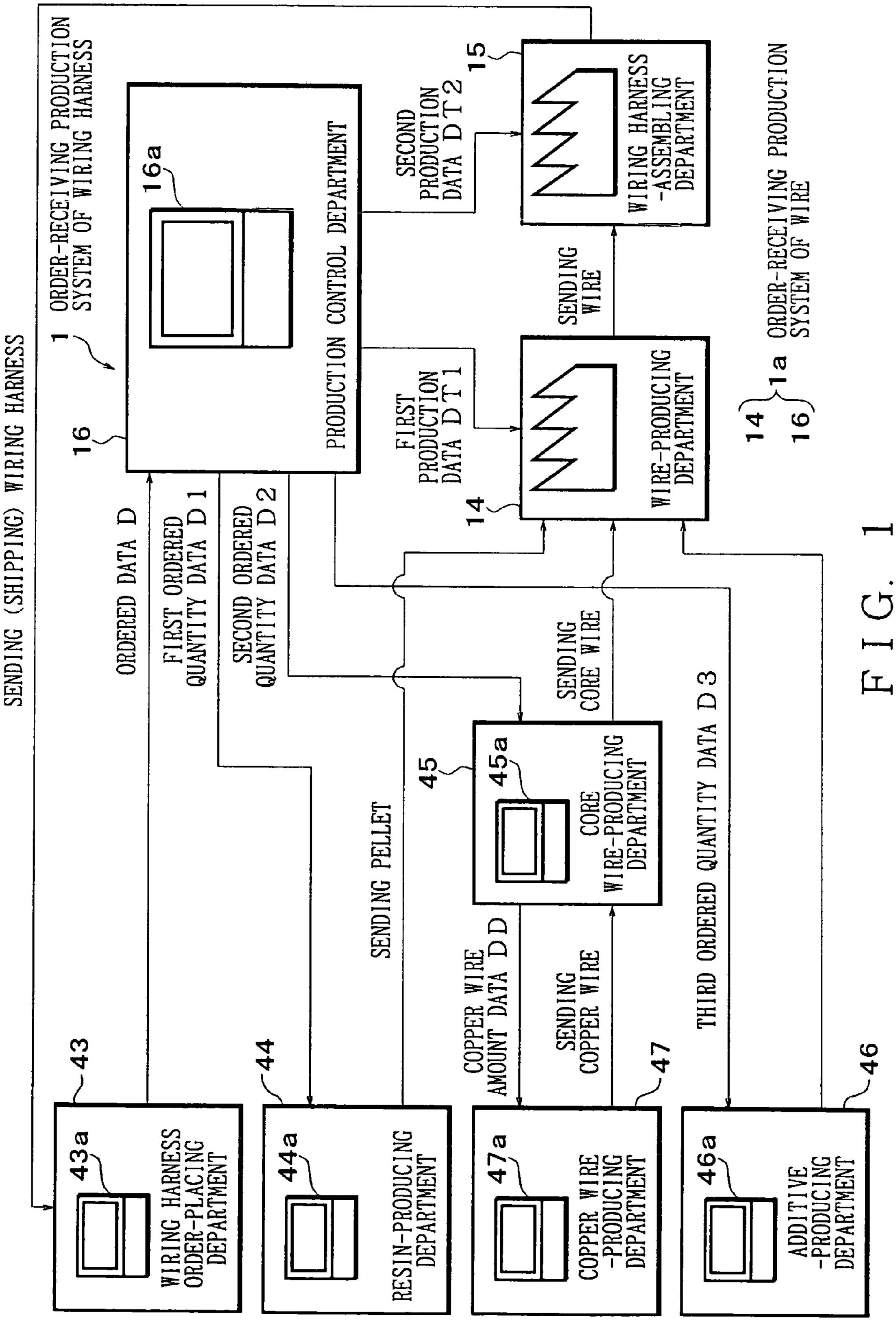
FIG. 1 shows a basic construction of an order-receiving production system of a wiring harness according to a preferred embodiment of the present invention.
Figure 6:
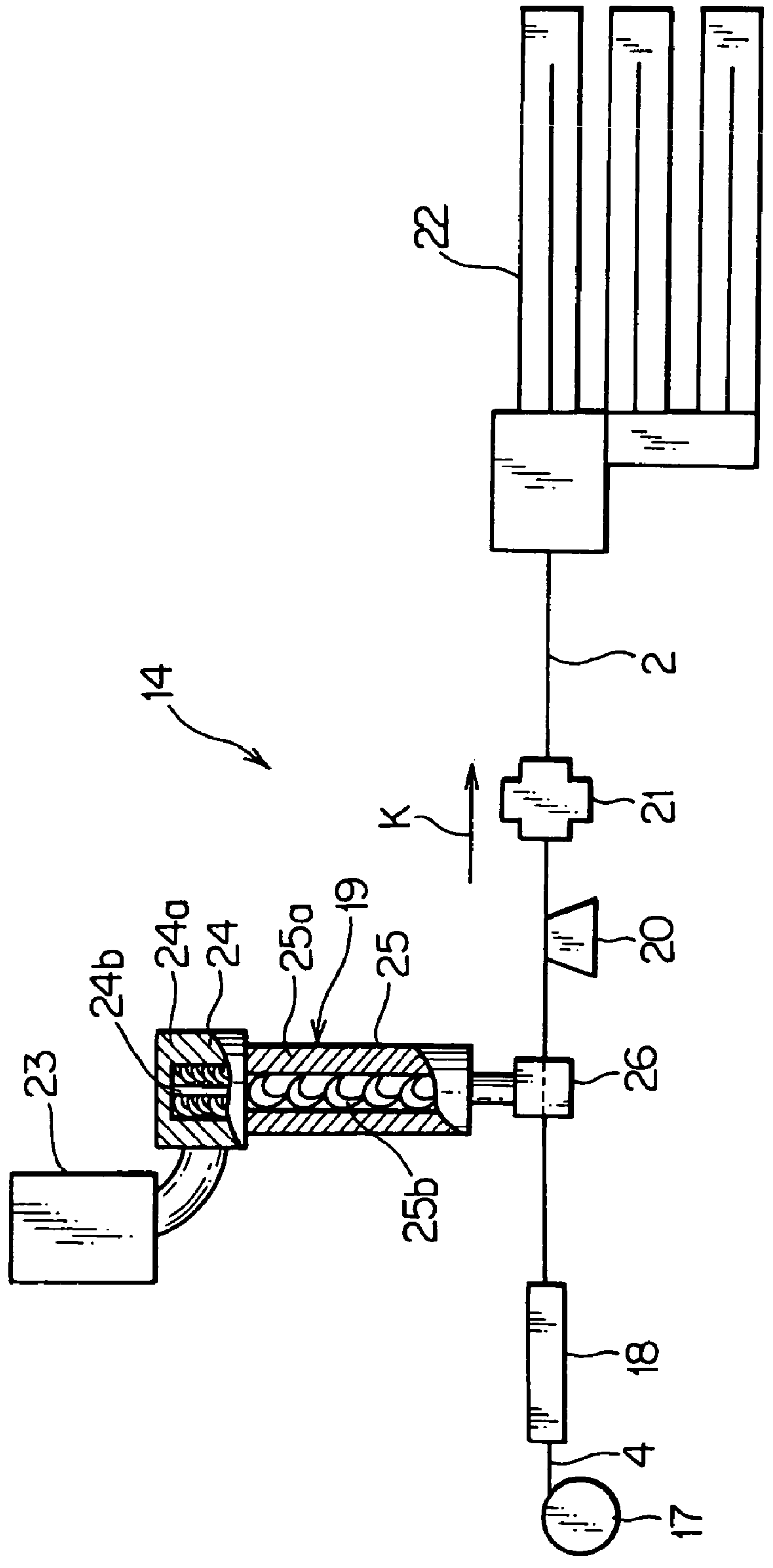
FIG. 6 shows a construction of a wire-producing section in the order-receiving production system of a wiring harness shown in FIG. 1.

As shown in FIG. 1, the order-receiving production system 1 of a wiring harness includes a wire-producing department 14, wiring harness-assembling department 15 and production control department 16. The wire-producing department 14 produces the wire 2. For example, wire-producing line in a wire-manufacturing plant is used as the wire-producing department 14. As shown in FIG. 6, the wire-producing department 14 includes a core wire-supplying unit 17, annealing unit 18, extrusion-coating unit 19, coloring device 20, crosslinking unit 21, and wire-cutting/terminal-crimp-contacting unit 22.

When the wire-producing department 14 produces the wire 2, the core wire 4 or the wire 2 is transferred through the core wire-supplying unit 17, annealing unit 18, extrusion-coating unit 19, coloring device 20, crosslinking unit 21, and wire-cutting/terminal-crimp-contacting unit 22 in this sequence. The wire-producing department 14 includes a belt pulley (not shown in the figure) to transfer the core wire 4 or the wire 2.

The core wire-supplying unit 17 supplies the wire 4 which is in a state that a plurality of the element wires are twisted together and the coating 5 is not applied yet. The annealing unit 18 heats up the core wire 4 and thereafter slowly cools it down to room temperature so as to remove the strain or the like generated in the core wire 4. Thus the annealing unit 18 anneals the core wire 4.

The extrusion-coating unit 19 includes a preblender 23, kneader 24, conveyer 25, and extrusion head 26. The preblender 23 is formed in a shape of a box having an upper opening and receives the pellets and additive described above. The preblender 23 has a vane wheel (not shown). The vane wheel rotates so as to crush and mix the pellets with the additive and conveys them to the kneader 24.

The kneader 24 includes a cylindrical body 24*a*, heating unit (not shown), and a vane wheel 24*b*. The body 24*a* transfers the pellets and additive supplied from the preblender 23 thereinto. The heating unit heats up and melts specifically the pellets in the body 24*a*. The vane wheel 24*b* rotates so as to mix the molten pellets and the additive in the body 24*a* and transfers them to the conveyer 25. The kneader 24 heats up the pellets so as to melt them and thereafter mixes the molten pellet with the additive uniformly and thereafter transfers them to the conveyer 25.

The conveyer 25 includes a cylindrical body 25*a*, heating unit (not shown), and a vane wheel 25*b*. The body 25*a* transfers the pellets and additive supplied from the kneader 24 thereinto. The heating unit specifically heats up the pellets to keep them in a molten state in the body 25*a*. The vane wheel 25*b* rotates so as to transfer the molten pellets and the additive in the body 25*a* to the extrusion head 26. The conveyer 25 transfers the mixed molten pellets and the additive to the extrusion head 26.

The extrusion head 26 has a core wire-guiding part for guiding the core wire therethrough. The core wire 4 moves through the core wire-guiding part so that the extrusion head 26 extrusion-coats the core wire 4 with the mixed molten pellet and additive. Thus, the extrusion-coating unit 19 extrudes the mixture of the pellets and the additive onto the circumference of the core wire 4 while simultaneously mixing the pellets and the additive so that the core wire 4 is coated with the mixture, thereby forming the coating 5.

Figure 7:
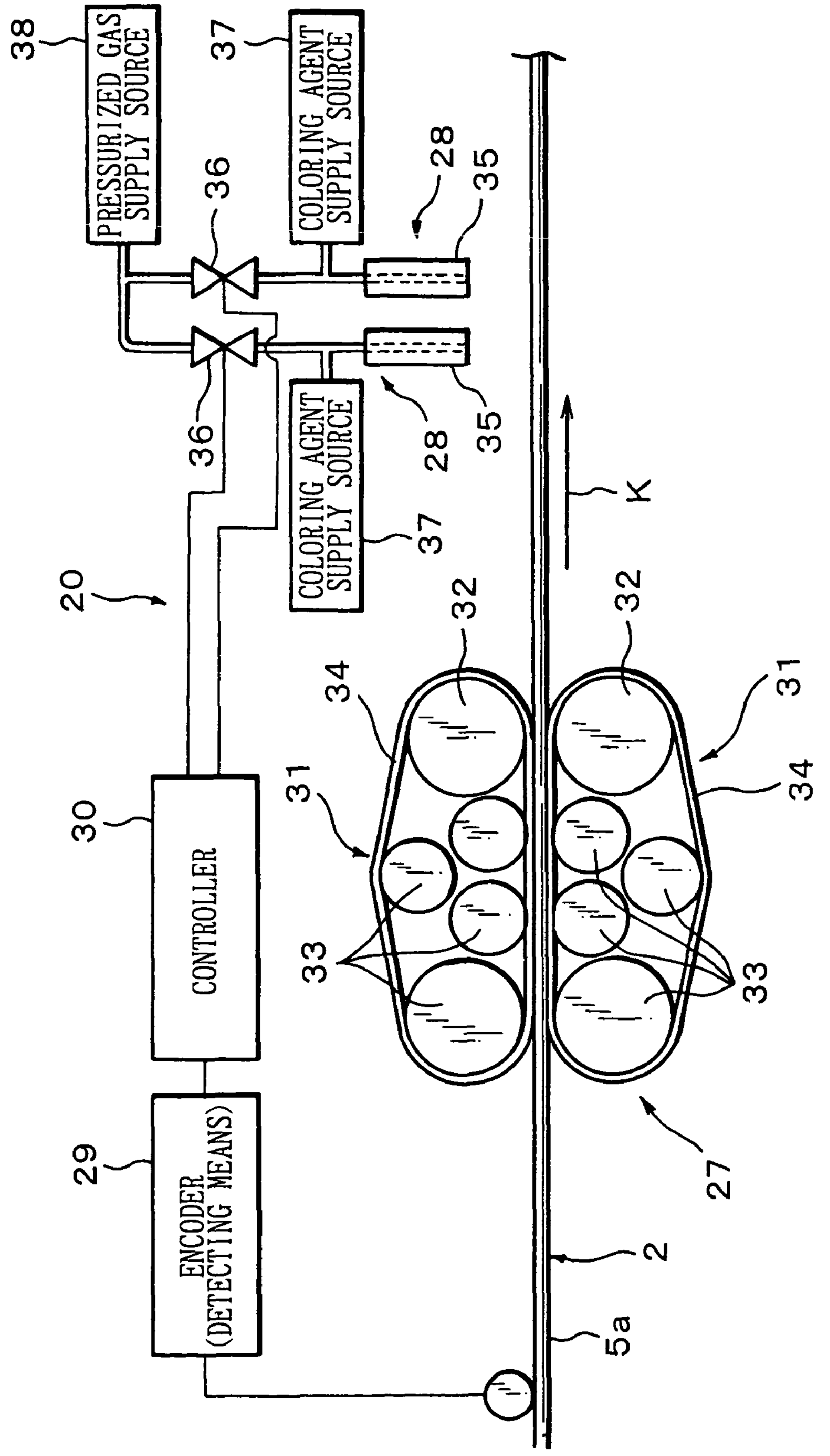
FIG. 7 shows a construction of a coloring device in the wire-producing department shown in FIG. 6.

A coloring device 20 marks a desired pattern on the outer surface 5*a* of the coating 5 of the wire 2, the coating 5 of which is extrusion-coated by the extrusion-coating unit 19. As shown in FIG. 7, the coloring device 20 includes a wire-forwarding unit 27, a plurality of coloring units 28, an encoder 29 as detection means, and controller 30.

The wire-forwarding unit 27 has a pair of belt-forwarding units 31. The belt-forwarding units 31 includes a drive pulley 32 rotated by a motor or the like, a plurality of idler pulleys 33, and an endless belt 34 tied up to the pulleys 32 and 33. The endless belt 34 rotates around the pulleys 32 and 33.

The pair of belt-forwarding units 31 holds the wire 2 therebetween and rotates the drive pulley 32 synchronously so as to rotate the endless belt 34, thereby forwarding the wire 2 by a specific length. At this time, the pair of belt-forwarding units 31 transfers the wire 2 along an arrow K shown in FIGS. 6 and 7, which is parallel to the longitudinal direction of the wire 2.

In the figure, a pair of the coloring units 28 is provided. The pair of the coloring units 28 is arranged along the arrow K. Each coloring unit 28 has a nozzle 35 and valve 36. The nozzle 35 faces the wire 2, which is transferred along the arrow K by the pair of belt-forwarding units 31'. The coloring agent of the color B is supplied from a coloring agent supply source 37 (shown in FIG. 7) into the nozzle 35 of the coloring unit 28.

The valve 36 is connected to the nozzle 35. The valve 36 is also connected to a pressurized gas supply source 38 (shown in FIG. 7), which supplies pressurized gas to the nozzle 35 through the valve 36. When the valve 36 is opened, by the pressurized gas supplied from the pressurized gas supply source 38, the coloring agent in the nozzle 35 spouts out toward the outer surface 5*a* of the wire 2.

When the valve 36 is closed, the coloring agent stops spouting. According the construction described above, the coloring unit 28 opens the valve 36 for a predetermined period of time by a signal from the controller 30 so that the specific amount of the coloring agent is spouted toward the outer surface 5*a* of the wire 2.

The coloring agent means a liquid substance, in which a coloring material (organic substance for use in industry) is dissolved and dispersed in water or other solvent. The organic substance described above is a dye or a pigment (mainly, organic substance and synthetic product). Sometimes, a dye is used as a pigment and a pigment is used as a dye. As a substantial example, the coloring agent is a coloring liquid or coating material.

The coloring liquid is a liquid, in which a dye is dissolved or dispersed in a solvent. The coating material is a material, in which a pigment is dispersed in a liquid dispersion. When the coloring liquid adheres to the outer surface 5*a* of the wire 2, the dye permeates into the coating 5. When a coating material adheres to the outer surface 5*a* of the wire 2, the pigment adheres to the outer surface 5*a* without permeating into the coating 5 of the wire 2.

That is, the coloring unit 28 dyes a part of the outer surface 5*a* of the wire 2 with a dye or coats a part of the outer surface 5*a* of the wire 2 with a pigment. Accordingly, marking the outer surface 5*a* of the wire 2 means that a part of the outer surface 5*a* of the wire 2 is dyed with a dye and a part of the outer surface 5*a* of the wire 2 is coated with a pigment.

Preferably, the solvent and liquid dispersion have an affinity to the synthetic resin for constituting the coating 5 of the wire 2 in order to securely permeate the dye into the coating 5 of the wire 2 or to make the pigment securely adhere to the outer surface 5*a* of the coating 5 of the wire 2.

Coloring the outer surface 5*a* of the wire 2 in this specification means either coloring the whole outer surface 5*a* or coloring a part of the outer surface 5*a*. Accordingly, coloring the outer surface 5*a* of the wire 2 in this specification includes the marking on the outer surface 5*a* of the wire 2.

The encoder 29 measures an amount of the movement of the wire 2 and information based on a speed of the movement and outputs them to the controller 30. The controller 30 is a computer including known RAM, ROM, CPU and so on, and is connected to the encoder 29 and valve 36 in order to control the whole coloring device 20.

The controller 30 memorizes the distance between the spots 6 formed on the outer surface 5*a* of the wire 2, the diameter and the number of the spots 6. The controller 30 memorizes many kinds of the mark 7 described above. That is, the controller 30 memorizes a plurality of patterns of the mark 7. The controller 30 memorizes the distance between the nozzles 35 of the coloring unit 28.

The controller 30 receives a first production data DT1 explained later on. On the basis of the inputted first production data DT1, the information of the speed of the wire 2 from the encoder 29 and the distance between the nozzles 35, the controller 30 controls each valve 36 and the pressurized gas supply source 38 so that the spots 6, that is, the marks 7 are formed on the outer surface 5*a* of the wire 2 with a pattern which meets the first production data DT1.

When the coloring device 20 forms the spots 6 on the outer surface 5*a* of the wire 2, that is, marks the outer surface 5*a* of the wire 2, the pair of belt-forwarding units 31 transfers the wire 2 along the arrow K. Then, the controller 30 controls the valve 36 and so on so as to spout the specific amount of the coloring agent from the nozzle 35 of each coloring unit 28 toward the outer surface 5*a* of the wire 2. The controller 30 forms the marks 7 on the outer surface 5*a* of the wire 2 with a pattern which meets the first production data DT1.

Thus, the coloring device 20 coats the outer surface 5*a* of the coating 5 of the wire 2 with coating medium or dyes the outer surface 5*a* of the coating 5 of the wire 2 with coloring liquid so as to mark the outer surface 5*a* of the wire 2 with a specific pattern (that is, so as to form the mark 7 of the color B in a desired shape). The coloring device 20 colors the outer surface 5*a* of the wire 2 so as to form the marking pattern described above.

Figure 8:
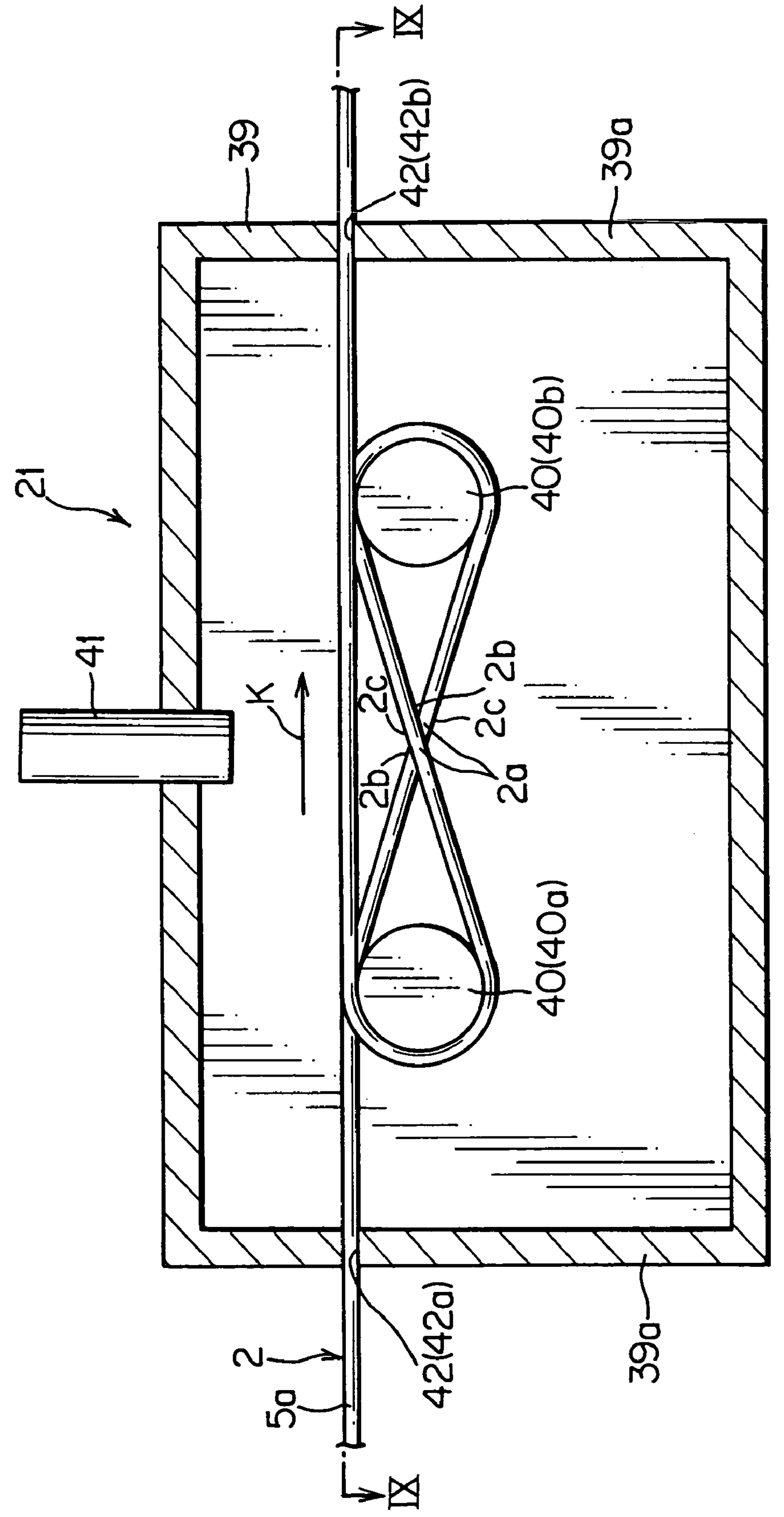
FIG. 8 is a longitudinal cross section illustrating a construction of a wire-crosslinking device in the wire-producing department shown in FIG. 6.

The crosslinking unit 21 crosslinks the wires 2 which are colored in a specific pattern by the coloring device 20. As shown in FIG. 8, the crosslinking unit 21 includes an enclosed box 39 the interior of which is sealed, a pair of rollers 40 and an electron gun 41 as irradiation means. The box 39 has a pair of guide holes 42 for guiding the wire 2 therethrough. The guide hole 42 corresponds to the wire-guiding part described in the claims.

The guide hole 42 penetrates through a wall 39*a* which constitutes the box 39. One guide hole 42 faces the opposite guide hole 42 having a distance therebetween. One guide hole 42*a* situated at left in FIG. 8 guides the wire 2 from the outside of the crosslinking unit 21, that is, the outside of the box 39 into the crosslinking unit 21, that is, into the box 39. The opposite guide hole 42*b* situated at right in FIG. 8 guides the wire 2 from the inside of the crosslinking unit 21, that is, the inside of the box 39 to the outside of the crosslinking unit 21, that is, to the outside of the box 39. Thus, the guide holes 42*a* and 42*b* guide the wire 2 so that the wire 2 moves along the arrow K. An outer surface of the box 39 is covered with lead or the like so that the electron beam does not leak out to the outside.

A pair of rollers 40 is provided rotatably in the box 39. The pair of the rollers 40 is arranged having a distance therebetween along the direction (the arrow K), in which the guide hole 42*a* faces the guide hole 42*b*. The center of the rotation of the roller 40*a* is parallel to that of the roller 40*b* and crosses the arrow K at right angles. The pair of the rollers 40 ties up the wire 2 with the wire's sleeves tucked up and guides the wire 2 from one guide hole 42*a* toward an opposite guide hole 42*b*.

In the figure, the wire 2 is guided through the upper of one roller 40*a* situated near to one guide hole 42*a* and made come in contact with the outer circumferential surface of the one roller 40*a* and thereafter, is guided through the lower of an opposite roller 40*b* situated near to an opposite guide hole 42*b* and made come in contact with the outer circumferential surface of the opposite roller 40*b*. Thereafter, the wire 2 is guided through the upper of the opposite roller 40*b* and thereafter, guided again the lower of the one roller 40*a* and made come in contact with the outer circumferential surface of the one roller 40*a*. Thereafter, the wire 2 is guided from the upper of the one roller 40*a* and guided through the opposite guide hole 42*b* so as to guide the wire 2 toward the outside of the box 39. Thus, the pair of the rollers 40*a* and 40*b* ties up the wire 2 with the wire's sleeves tucked up. Therefore, as shown in FIG. 8, the wire 2 is tied up in a shape of a letter of "8" in a lateral view.

Figure 9:
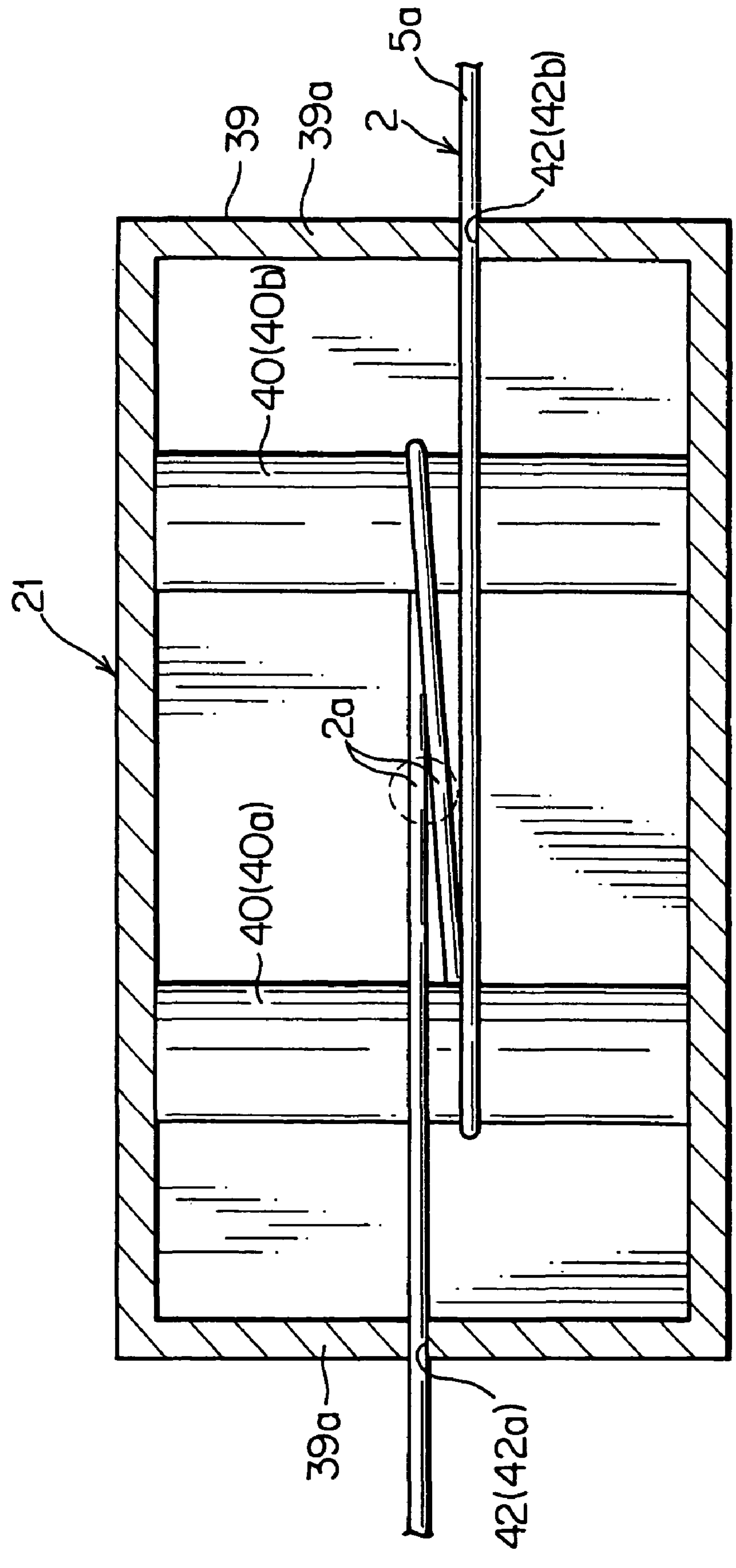
FIG. 9 is a cross sectional view taken along IX-IX line in FIG. 8.

The electric gun 41 irradiates an electron beam toward the center shown with a dotted line in FIG. 9 between the pair of the rollers 40*a* and 40*b*. The electron gun 41 irradiates an electron beam onto a portion 2*a* where the wire 2 crosses each other between the pair of the rollers 40*a* and 40*b*. That is, the electron gun 41 irradiates an electron beam onto both one surface side 2*b* shown in FIG. 8 of the wire 2 and an opposite surface side 2*c* of the wire 2, wherein the opposite surface side 2*c* is situated at the back of the one surface side 2*b*.

The crosslinking unit 21 guides the wire 2, which is marked in a desired pattern by the coloring device 20, through the one guide hole 42*a* and guides the wire 2 into the box 39. The crosslinking unit 21 ties up the wire 2 to the pair of the rollers 40*a*, 40*b* with the wire's sleeves tucked up and guides the wire 2 through the opposite guide hole 42*b* so as to guide the wire 2 toward the outside of the box 39. At this time, the crosslinking unit 21 makes the electron gun 41 irradiate an electron beam onto the portion 2*a* where the wire 2 crosses each other between the pair of the rollers 40*a* and 40*b*, thereby crosslinking the coating 5 of the wire 2 so as to improve the mechanical strength of the coating 5. The crosslinking unit 21 corresponds to the wire-crosslinking device described in the claims.

The wire-cutting/terminal-crimp-contacting unit 22 cuts the wire 2, which is crosslinked by the crosslinking unit 21, into a specific length and attaches a terminal fitting, which is received in a connector housing of the connector 8 described above, to an end of the cut wire 2.

The first production data DT1 explained later on is forwarded from a personal computer 16*a* explained later on of the production control department 16 to the wire-producing department 14. The pellets which meets the first production data DT1, the core wire 4 which meets a second production data DT2 explained later on and the additive which meets the third production data DT3 explained later on are transferred from a resin-producing department 44, core wire-producing department 45, and additive-producing department, respectively, to the wire-producing department 14.

Then, the wire-producing department 14 supplies the core wire 4 from the core wire-supplying unit 17 and puts the pellets and additive into the preblender 23 of the extrusion-coating unit 19. Then, the extrusion-coating unit 19 extrudes the mixture of the pellets and the additive onto the circumference of the core wire 4 while simultaneously mixing the pellets and the additive so that the core wire 4 is coated with the mixture, thereby producing the wire 2, the outer surface 5*a* of which is the monochrome P.

In the wire-producing department 14, the coloring device 20 marks the produced wire 2 with a specific pattern and the crosslinking unit 21 carries out the crosslinking, thereby obtaining the wire 2 shown in FIG. 4. The wire-producing department 14 conveys the produced wire 2 to the wiring harness-assembling department 15. When the wire-producing department 14 receives the first production data DT1, on the basis of the data DK1, DK2, DK3 and so on, the department 14 computes a fourth confirmation data DK4 (shown in FIG. 2) indicating a date when the production of the wire 2 is finished for meeting the first production data DT1 and so on. The wire-producing department 14 forwards the fourth confirmation data DK4 to both the personal computer 16*a* of the production control department 16 and the wiring harness-assembling department 15.

As the wiring harness-assembling department 15, for example, a wiring harness-assembling line in a wiring harness plant is used. The wiring harness-assembling department 15 assembles a wiring harness 3 by using the wire 2 produced in the wire-producing department 14 and various components 8, 9, 10, 11 and 12 mentioned above. After the assembled wiring harness 3 is subjected to a continuity test, visual examination and so on, the wiring harness-assembling department 15 conveys the wiring harness 3 to a wiring harness order-placing department 43 shown in FIG. 1.

The second production data DT2 is also forwarded from the production control department 16 to the wiring harness-assembling department 15. The fourth confirmation data DK4 is also forwarded from the wire-producing department 14 to the wiring harness-assembling department 15. On the basis of the data DT2 and DK4, the wiring harness-assembling department 15 computes a fifth confirmation data DK5 (shown in FIG. 2) indicating a date when the production of the wiring harness 3 is finished for meeting the second production data DT2 and so on. The wiring harness-assembling department 15 forwards the fifth confirmation data DK5 to the personal computer 16*a* of the production control department 16.

Used as the production control department 16 is a supervision department for supervising a business section of the wiring harness 3 or a supervision department for supervising a production line of a product such as a wiring harness 3 to be produced from the wire 2. As shown in FIG. 1, the production control department 16 has a portable computer 16*a* (hereinafter, personal computer) which includes a known RAM, ROM and CPU.

As shown in FIG. 1, the personal computer 16*a* of the production control department 16 is connected to a portable computer 43*a* (hereinafter, personal computer) of the wiring harness order-placing department 43, a portable computer 44*a* (hereinafter, personal computer) of the resin-producing department 44 as a first producing department, a portable computer 45*a* (hereinafter, personal computer) of the core wire-producing department 45 as a second producing department, a portable computer 46*a* (hereinafter, personal computer) of the additive-producing department 46 as a third producing department, the wire-producing department 14, and the wiring harness-assembling department 15 through a network or the like. The personal computer 16*a* of the production control department 16 controls these described above. The wiring harness order-placing department 43 belongs to the order-placing department. The production control department 16 controls the whole order-receiving production system 1 of a wiring harness.

For example, a resin-producing plant (resin maker) for producing synthetic resin for constituting the coating 5 is used as the resin-producing department 44. The resin-producing department 44 has a personal computer 44*a* including a known RAM, ROM and CPU. Upon receiving a first ordered quantity data D1 explained later on, the resin-producing department 44 produces the amount of the pellets, which meets the first ordered quantity data D1. The pellet consists of the synthetic resin for constituting the coating 5 of the wire 2 and is granular. The resin-producing department 44 transfers the produced pellets to the wire-producing department 14.

When the personal computer 44*a* of the resin-producing department 44 receives the first ordered quantity data D1, the resin-producing department 44 produces the amount of the pellets which meets the first ordered quantity data D1 and computes the first confirmation data DK1 (shown in FIG. 2) indicating a date when the produced pellets can be transferred to the wire-producing department 14 and so on. The personal computer 44*a* of the resin-producing department 44 forwards the first confirmation data DK1 to both the personal computer 16*a* of the production control department 16 and the wire-producing department 14.

As the core wire-producing department 45, a core wire-production line in a wire-producing plant is used. The core wire-producing department 45 has a personal computer 45*a* including a known RAM, ROM and CPU. Upon receiving a second ordered quantity data D2 from the production control department 16, the core wire-producing department 45 produces the core wire 4 of the wire 2. Upon receiving a second ordered quantity data D2 from the production control department 16, the personal computer 45*a* computes copper wire amount data DD (shown in FIG. 2) indicating the amount of the copper wire, which meets the second ordered quantity data D2. The personal computer 45*a* forwards the copper wire amount data DD to a portable computer 47*a* (hereinafter, personal computer) of the copper wire-producing department 47.

As the copper wire-producing department 47, a copper wire-producing line in a wire-producing plant or a copper wire-producing line in a metal-producing plant (metal maker) is used. The copper wire-producing department 47 has a personal computer 47*a* including a known RAM, ROM and CPU. When the personal computer 47*a* receives the copper wire amount data DD, the copper wire-producing department 47 produces the amount of the copper wire, which meets the copper wire amount data DD, and transfers the produced copper wire to the copper wire-producing department 45. The copper wire is made of electrically conductive metal similar to the element wire for constituting the core wire 4, such as copper, and is thicker than the element wire. When the personal computer 47*a* receives the copper wire amount data DD, the copper wire-producing department 47 produces the amount of the copper wire, which meets the copper wire amount data DD, and forwards copper wire amount confirmation data DDK (shown in FIG. 2) indicating a date when the produced copper wire can be transferred to the core wire-producing department 45 and so on to the personal computer 45*a* of the core wire-producing department 45.

The core wire-producing department 45 forms the copper wire forwarded from the copper wire-producing department 47 thin by guiding it through a die, thereby producing an element wire. The core wire-producing department 45 twists the element wires so as to produce the core wire 4 and transfers the produced core wire 4 to the wire-producing department 14. When the personal computer 45*a* receives the second ordered quantity data D2, on the basis of the copper wire amount confirmation data DDK and so on, the core wire-producing department 45 produces the amount of the core wire 4, which meets the second ordered quantity data D2, and computes the second confirmation data DK2 (shown in FIG. 2) indicating a date when the produced core wire 4 can be transferred to the wire-producing department 14. The personal computer 45*a* forwards the second confirmation data DK2 to both the personal computer 16*a* of the production control department 16 and the wire-producing department 14.

As the additive-producing department 46, an additive-producing plant (additive maker) for producing an additive for adding into the synthetic resin for constituting the coating 5 of the wire 2 is used. As the additive, a plasticizer or various coloring agents can be used. The additive is a liquid or powder. The additive-producing department 46 has a personal computer 46*a* including a known RAM, ROM and CPU.

When the personal computer 46*a* receives a third ordered quantity data D3, the additive-producing department 46 produces the amount of the additive, which meets the third ordered quantity data D3, and transfers the produced additive to the wire-producing department 14. When the personal computer 46*a* receives a third ordered quantity data D3, additive-producing department 46 produces the additive and the personal computer 46*a* computes third confirmation data DK3 (shown in FIG. 2) indicating a date when the produced additive can be transferred to the wire-producing department 14 and forwards the third confirmation data DK3 to both the personal computer 16*a* of the production control department 16 and the wire-producing department 14.

Ordered data D indicating the ordered quantity of the wiring harness 3, i.e. the ordered quantity of the wire 2 is inputted from the personal computer 43*a* of the wiring harness order-placing department 43 to the personal computer 16*a* of the production control department 16. The ordered data D indicates the product number and the number of the wiring harness 3, the product number and the length of the wire 2 of the wiring harness 3 having each product number, and the product number and the number of the components 8, 9, 10, 11, and 12 of the wiring harness having each product number. That is, the ordered data D indicates the ordered quantity of the wiring harness 3, that is, the ordered quantity of the wire 2. Thus, the production control department 16 receives the order of the wire 2.

When the personal computer 16*a* of the production control department 16 receives the order of the wiring harness 3, that is, the order of the wire 2 from a wiring harness order-placing department 43, the personal computer 16*a* makes each department 44, 45 and 46 produce the necessary amount of the pellet, core wire 4 and additive, respectively, and makes each department transfer the respective products to the wire-producing department 14. Thereafter, the personal computer 16*a* makes the wire-producing department 14 produce the wire 2 by using the above products (the pellet, core wire 4 and additive) and transfer the produced wire 2 to the wiring harness-assembling department 15. Thereafter, the personal computer 16*a* makes the wiring harness-assembling department 15 assemble the wiring harness 3 and transfer (ship) the assembled wiring harness 3 to the wiring harness order-placing department 43.

At this time, the first, second and third confirmation data DK1, DK2 and DK3 are forwarded from the respective personal computers 44*a*, 45*a* and 46*a* of the respective departments 44, 45 and 46 to the personal computer 16*a* of the production control department 16. Further, the fourth and fifth confirmation data DK4 and DK5 are forwarded from the wire-producing department 14 and the wiring harness-assembling department 15, respectively, to the personal computer 16*a* of the production control department 16. The personal computer 16*a* forwards the fifth confirmation data DK5 to the personal computer 43*a* of the wiring harness order-placing department 43.

The personal computer 16*a* is a control system including a sequence for supplying an information necessary to produce and assemble the wire 2 and wiring harness 3 (data D1, D2, D3, DT1 and DT2) to the respective departments, the wire-producing department 14 and wiring harness-assembling department 15. A sequence carried out by the personal computer 16*a* explained later on may be carried out artificially or by using a device into which a machine and electrical information is installed.

Figure 2:
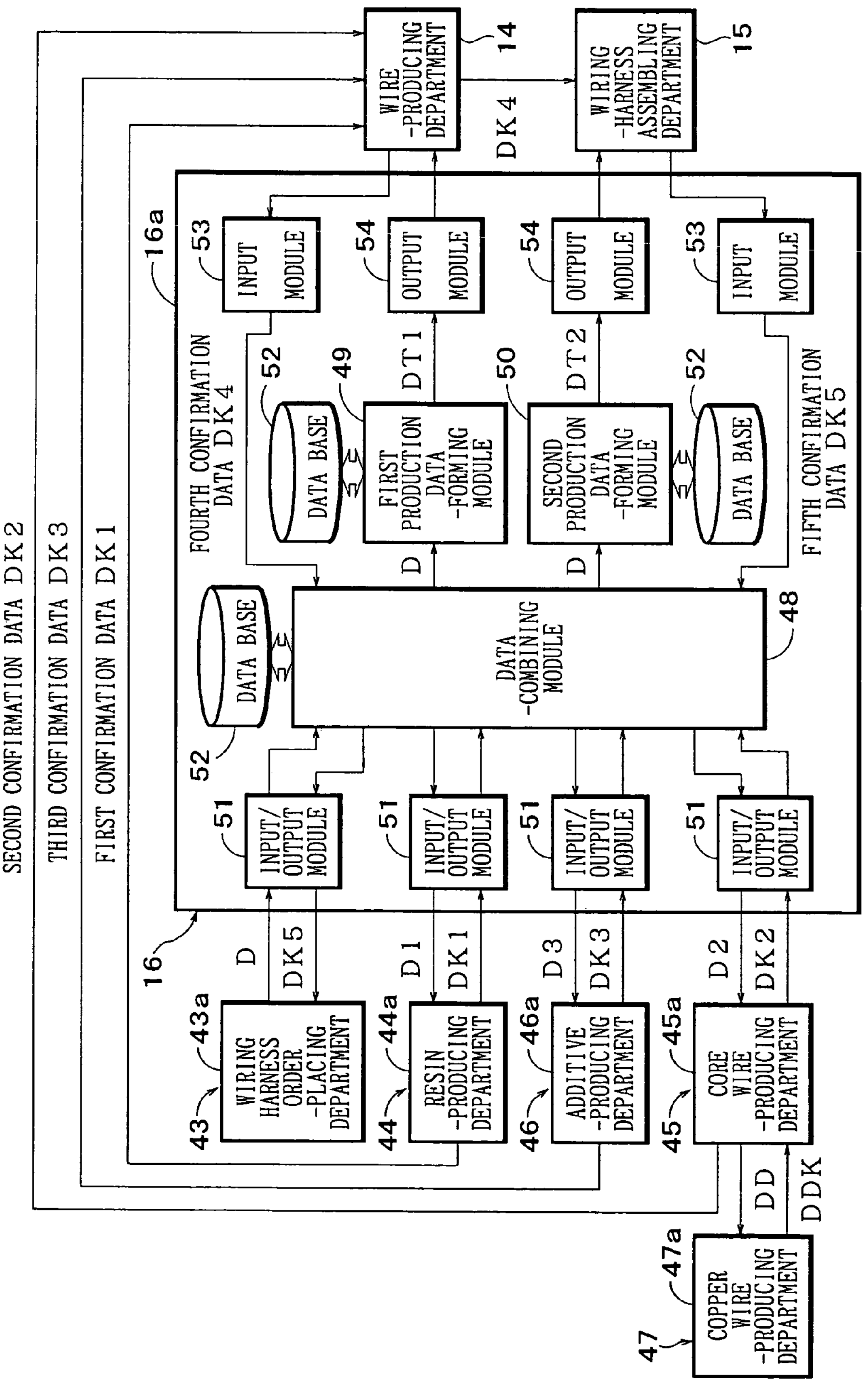
FIG. 2 shows a basic construction of a production control section in the order-receiving production system of a wiring harness shown in FIG. 1.

As shown in FIG. 2, the personal computer 16*a* includes data-combining module 48, first production data-forming module 49, and second production data-forming module 50. The data-combining module 48 is connected to the personal computer 43*a* of the wiring harness order-placing department 43, personal computer 44*a* of the resin-producing department 44, personal computer 45*a* of the core wire-producing department 45, and personal computer 46*a* of the additive-producing department 46 through an input/output module 51. The ordered data D is inputted into the data-combining module 48.

The data-combining module 48 decodes the ordered data D on the basis of a program stored in a database 52. The data-combining module 48 computes the first ordered quantity data D1 (shown in FIG. 1) indicating the product number of the pellet and the amount per the product number, which are necessary for the wire 2 in the ordered data D. The data-combining module 48 forwards the first ordered quantity data D1 to the personal computer 44*a* of the resin-producing department 44 through the input/output module 51.

The data-combining module 48 computes the second ordered quantity data D2 (shown in FIG. 1) indicating the product number of the core wire 4 and the amount per the product number, which are necessary for the wire 2 in the ordered data D. The data-combining module 48 forwards the second ordered quantity data D2 to the personal computer 45*a* of the core wire-producing department 45 through the input/output module 51.

The data-combining module 48 computes the third ordered quantity data D3 (shown in FIG. 1) indicating the product number of the additive and the amount per the product number, which are necessary for the wire 2 in the ordered data D. The data-combining module 48 forwards the third ordered quantity data D3 to the personal computer 46*a* of the additive-producing department 46 through the input/output module 51. Further, the data-combining module 48 forwards the ordered data D to both the first production data-forming module 49 and second production data-forming module 50.

The data-combining module 48 is connected to the wire-producing department 14 and the wiring harness-producing department 15 through an input module 53. The data-combining module 48 receives the fourth confirmation data DK4 from the wire-producing department 14 and the fifth confirmation data DK5 from the wiring harness-assembling department 15. The data-combining module 48 forwards the fifth confirmation data DK5 to the personal computer 43*a* of the wiring harness order-placing department 43 through the input/output module 51.

The first production data-forming module 49 decodes the ordered data D on the basis of a program stored in the database 52 and computes the first production data DT1 indicating the length per the product number of the wire 2 necessary for the ordered data D. The first production data-forming module 49 forwards the first production data DT1 to the wire-producing department 14 through an output module 54.

The second production data-forming module 50 decodes the ordered data D on the basis of a program stored in the database 52 and computes the second production data DT2 indicating the number of the wiring harness per the product number necessary for the ordered data D. The second production data-forming module 50 forwards the second production data DT2 to the wiring harness-assembling department 15 through the output module 54.

The production control department 16 and the wire-producing department 14 constitute the order-receiving production system 1*a* of the wire.

Figure 3:
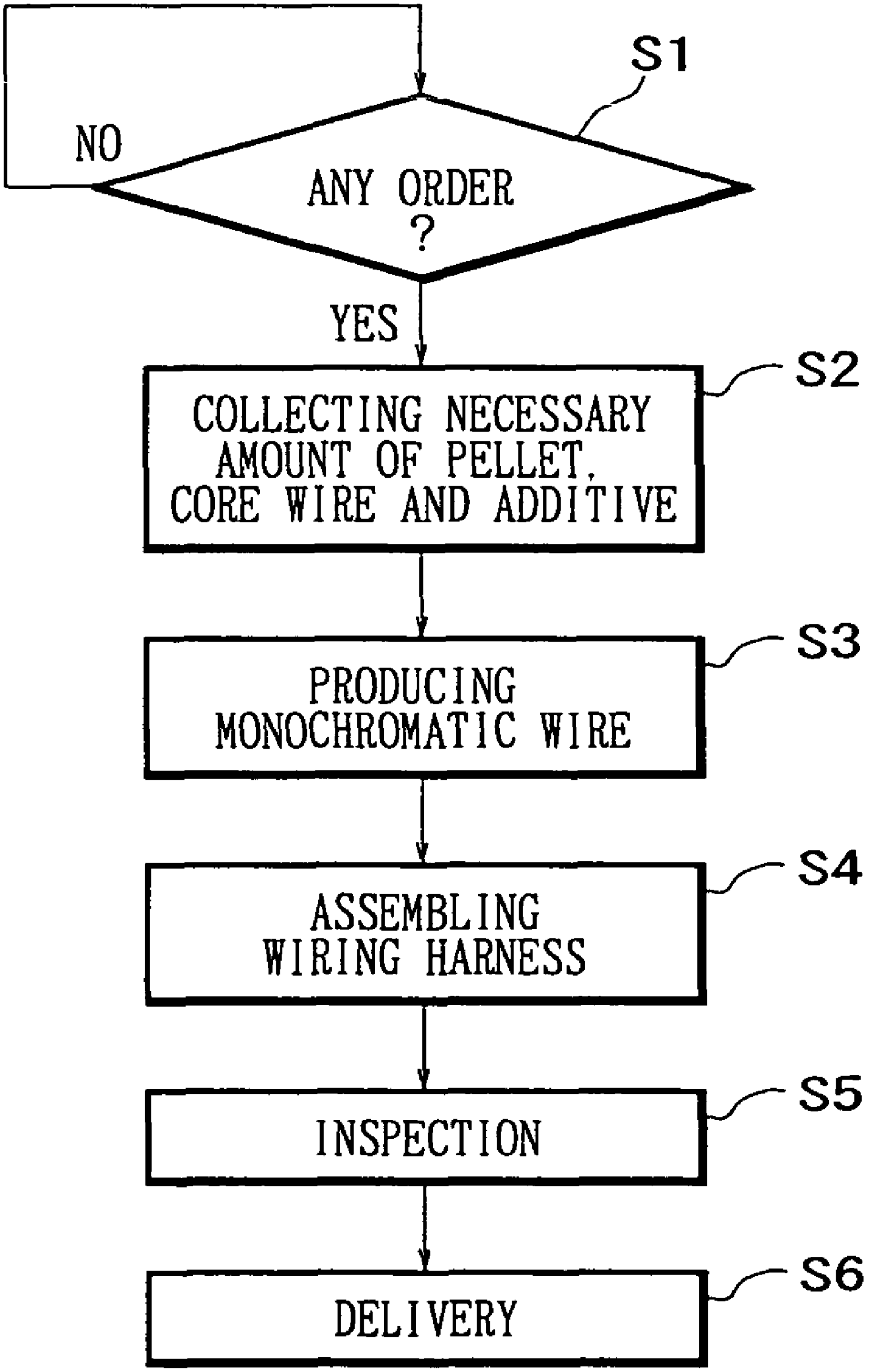
FIG. 3 is a flow chart illustrating a step flow for producing a wiring harness in the order-receiving production system of a wiring harness shown in FIG. 1.

When the wiring harness 3, i.e. the wire 2 is produced by using the order-receiving production system 1 of the wiring harness, first, in step S1 shown in FIG. 3, it is judged whether or not the order of the wiring harness 3, i.e. wire 2 is received. If not received, step S1 is repeated, and if received, the process advances to step S2.

In step S2, the personal computer 16*a* of the production control department 16 forwards the first production data DT1 to the wire-producing department 14 and forwards the second production data DT2 to the wiring harness-assembling department 15. Further, the personal computer 16*a* forwards the respective ordered quantity data D1, D2 and D3 to the respective departments 44, 45 and 46. Then, the respective departments 44, 45 and 46 forward the respective confirmation data DK1, DK2 and DK3 to both the personal computer 16*a* of the production control department 16 and the wire-producing department 14.

Further, the wire-producing department 14 computes the fourth confirmation data DK4 and forwards them to both the wiring harness-assembling department 15 and the personal computer 16*a* of the production control department 16. The wiring harness-assembling department 15 computes the fifth confirmation data DK5 on the basis of the fourth confirmation data DK4 and the second production data DT2 and forwards the fifth confirmation data DK5 to the personal computer 16*a* of the production control department 16. The personal computer 16*a* forwards the fifth confirmation data DK5 to the personal computer 43*a* of the wiring harness order-placing department 43.

The respective departments 44, 45 and 46 produce the amount of the pellet, core wire 4 and additive, which meet the first, second and third ordered quantity data D1, D2 and D3, respectively, that is, the ordered data D. The core wire-producing department 45 forwards the copper wire ordered quantity data DD to the personal computer 47*a* of the copper wire-producing department 47. The copper wire-producing department 47 produces the amount of the copper wire, which meets the copper wire ordered quantity data DD, and transfers it to the core wire-producing department 45. The respective departments 44-45 and 46 transfer the amount of the pellet, core wire 4 and additive, which meet the first, second and third ordered quantity data D1, D2 and D3, respectively, that is, the ordered data D, to the wire-producing department 14.

Thus, in step S2, the respective amount of the pellet, core wire 4 and additive necessary to produce the wire 2 are collected and thereafter, the process proceeds to step S3.

In step S3, the core wire 4 transferred from the core wire-producing department 45 is supplied from the core wire-supplying unit 17 of the wire-producing department 14, and the pellets and additive are put into the preblender 23. The kneader 24 in the extrusion-coating unit 19 mixes the pellets and additive while moving the core wire 4, and the extrusion head 26 extrusion-coats the mixture around the core wire 4.

Thus, in step S3, the mixture of the pellets and additive is applied around the core wire 4 by the extrusion method while simultaneously mixing the pellets and additive, thereby producing the wire 2, the outer surface 5*a* of which has the monochrome P. Further, the wire-producing department 14 applies a specific marking onto the wire 2, crosslinks the wires 2, cuts the wire 2 into a specific length and attaches a terminal fitting to an end of the wire 2. Thus, the wire-producing department 14 produces the wire 2 of the monochrome P having a necessary length. The wire-producing department 14 transfers the produced wire 2 to the wiring harness-assembling department 15, then the process advances to step S4.

In step S4, the wiring harness-assembling department 15 bundles a plurality of the wires 2, inserts the terminal fitting into a connector housing and attaches a tube 9 for a harness, protector 10 for a harness, grommet 11 for a harness and clip 12 for wiring to respective specific portions of the wire 2. Further, a tape 13 for a harness is wound around a specific portion of the wire 2, thereby assembling a wiring harness 3, then the process advances to step S5.

In step S5, the wiring harness-assembling department 15 carries out a continuity test and visual examination for the assembled wiring harness 3, then the process advances to step S6. In step S6, the wiring harness-assembling department 15 transfers the assembled wiring harness 3 to the wiring harness order-placing department 43.

Thus, according to the above-described preferred embodiment of the order-receiving production system 1 of a wiring harness, an order-receiving production method of the wire 2 can be obtained, which is characterized in that after receiving an order of the wiring harness 3, i.e. of the wire 2, the pellet consisting of the synthetic resin, which constitutes the coating 5 of the wire 2 for constituting the wiring harness 3, the core wire 4 and the additive for mixing into the synthetic resin are collected with the respective necessary amount, thereafter the mixture of the pellets and additive is extrusion-coated around the core wire 4 while simultaneously mixing the pellets and additive, thereby the wire 2 having a necessary length is produced.

Further, an order-receiving production method of the wiring harness 3 can be obtained, which is characterized in that the desired components 8, 9, 10, 11 and 12 are attached to the produced wire 2 so as to assemble the wiring harness 3, then the assembled wiring harness 3 is transferred to the wiring harness order-placing department 43.

Further, an order-receiving production method of the wiring harness 3 can be obtained, which is characterized in that after receiving an order of the wiring harness 3, i.e. of the wire 2, the mixture of the pellets and additive is extrusion-coated around the core wire 4 while simultaneously mixing the pellets and additive, thereby the wire 2, the outer-surface 5*a* of which has the monochrome P, is produced.

Further, an order-receiving production method of the wire 2 and an order-receiving production method of the wiring harness 3 can be obtained, each of which is characterized in that the outer surface 5*a* of the wire 2 having the monochrome P is colored with a desired color B.

Further, an order-receiving production method of the wire 2 and an order-receiving production method of the wiring harness 3 can be obtained, each of which is characterized in that after receiving an order of the wiring harness 3, i.e. of the wire 2, the mixture of the pellets and additive is extrusion-coated around the core wire 4 while simultaneously mixing the pellets and additive, thereby producing the wire 2, and further the produced wires 2 are crosslinked.

Further, an order-receiving production system 1*a* of the wire 2 can be obtained, which is characterized in that the system 1*a* comprises:

the wire-producing department 14 for producing the wire 2;

the production control department 16 for controlling the wire-producing department 14 and receiving an order of the wire 2;

the resin-producing department 44 for producing a pellet;

the core wire-producing department 45 for producing the core wire 4; and the additive-producing department 46 for producing the additive, wherein the production control department 16: computes the first ordered quantity data D1 indicating an amount of the pellet of synthetic resin for constituting the coating 5 of the wire 2 corresponding to the amount D of the wire 2 of the received order from the wiring harness order-placing department 43 and forwards the first ordered quantity data D1 to the resin-producing department 44; computes the second ordered quantity data D2 indicating an amount of the core wire 4 corresponding to the amount D of the wire 2 of the received order from the department 43 and forwards the second ordered quantity data D2 to the core wire-producing department 45; and computes the third ordered quantity data D3 indicating an amount of the additive to be added to the synthetic resin corresponding to the amount D of the wire 2 of the received order from the department 43 and forwards the third ordered quantity data D3 to the additive-producing department 46, the producing departments 44, 45 and 46 produce the pellet, core wire 4 and additive to the amount corresponding to the first, second and third ordered quantity data D1, D2 and D3, respectively, and send the produced pellet, core wire 4 and additive, respectively, to the wire-producing department 14, and the wire-producing department 14 extrudes a mixture of the pellets sent from the resin-producing department 44 and the additive sent from the additive-producing department 46 onto the circumference of the core wire 4 sent from the core wire-producing department 45 while simultaneously mixing the pellets and the additive so that the core wire 4 is coated with the mixture, thereby producing the wire 2 having a necessary length.

Further, an order-receiving production system 1 of the wiring harness 3 can be obtained, which is characterized in that the system 1 comprises:

the wire-producing department 14 for producing the wire 2;

the wiring harness-assembling department 15 for assembling the wiring harness 3 by using the wire 2 produced by the wire-producing department 14;

the production control department 16 for controlling the wire-producing department 14 and the wiring harness-assembling department 15, and receiving an order of the wiring harness 3;

the resin-producing department 44 for producing a pellet;

the core wire-producing department 45 for producing the core wire 4; and the additive-producing department 46 for producing the additive, wherein the production control department 16: computes the first ordered quantity data D1 indicating an amount of the pellet of synthetic resin for constituting the coating 5 of the wire 2 corresponding to the amount D of the wire 2 of the wiring harness 3 of the received order from the wiring harness order-placing department 43 and forwards the first ordered quantity data D1 to the resin-producing department 44; computes the second ordered quantity data D2 indicating an amount of the core wire 4 corresponding to the amount D of the wire 2 of the wiring harness 3 of the received order from the department 43 and forwards the second ordered quantity data D2 to the core wire-producing department 45; and computes the third ordered quantity data D3 indicating an amount of the additive to be added to the synthetic resin corresponding to the amount D of the wire 2 of the wiring harness 3 of the received order from the department 43 and forwards the third ordered quantity data D3 to the additive-producing department 46, the producing departments 44, 45 and 46 produce the pellet, core wire 4 and additive to the amount corresponding to the first, second and third ordered quantity data D1, D2 and D3, respectively, and send the produced pellet, core wire 4 and additive, respectively, to the wire-producing department 14, the wire-producing department 14 extrudes a mixture of the pellets sent from the resin-producing department 44 and the additive sent from the additive-producing department 46 onto the circumference of the core wire 4 sent from the core wire-producing department 45 while simultaneously mixing the pellets and the additive so that the core wire 4 is coated with the mixture, thereby producing the wire 2 having a necessary length, and sends the produced wire 2 to the wiring harness-assembling department 15, and the wiring harness-assembling department 15 attaches the desired components 8, 9, 10, 11 and 12 to the wire 2 produced by the wire-producing department 14, thereby assembling the wiring harness 3, and thereafter the assembled wiring harness 3 is transferred to the wiring harness order-placing department 43.

According to the preferred embodiment, after receiving an order of the wiring harness 3, i.e. of the wire 2, the wire 2 of the monochrome P having a necessary length is produced. Therefore, the amount of the wire 2 to be stocked in advance can be reduced. Since the wire 2 having the monochrome P is used, the number of types (i.e. color) of the wire 2 to be stocked in advance can be reduced.

The production control department 16 forwards the data D1, D2 and D3 to the resin-producing department 44, core wire-producing department 45 and additive-producing department 46, respectively. Therefore, after receiving an order of the wiring harness 3, i.e. of the wire 2, the starting-material of the wire 2 can securely be collected.

Since the wire-producing department 14 extrusion-coats the mixture of the pellets and additive around the core wire 4 while simultaneously mixing the pellets and additive, a period of time required for the production of the wire 2 can be shortened compared to a case when the pellets and additive are mixed in a compounder. Therefore, even when the wire 2, i.e. the wiring harness 3 is produced after receiving an order, the wire 2, i.e. the wiring harness 3 can be produced in a desired period of time. Further, since the wire 2 is produced after receiving an order the amount of the wire 2 to be stocked in advance can be reduced.

Accordingly, a space for stocking the wire 2 in advance can be reduced and a space for temporarily stocking the wire 2 during the production can be reduced, thereby reducing the cost of the wire 2 or a product to be produced from the wire 2, such as the wiring harness 3. Since the wire 2 having a necessary length is produced after receiving an order of the wire 2, thereby preventing the wire 2 from being produced excessively.

Since the outer surface 5*a* of the wire 2, which is produced after receiving an order, has the monochrome P, thereby improving the production efficiency and reducing the number of the types (i.e. color) of the wire 2 to be stocked in advance. A space for stocking the wire 2 in advance can be reduced and a space for temporarily stocking the wire 2 during the production can be reduced, thereby reducing the cost of the wire 2 or a product to be produced from the wire 2, such as the wiring harness 3.

The wire-producing department 14 includes the coloring device 20 for marking the outer surface 5*a* of the wire 2 having the monochrome P. Therefore, the wire 2 colored with various colors B can be obtained. One wire can be distinguished from another wire, thereby preventing an error in wiring the wires 2 from occurring. Therefore, the quality of the wiring harness 3 can be prevented from deteriorating.

The wire-producing department 14 further includes the crosslinking unit 21 for crosslinking the wires 2. Therefore, the wire 2, the coating 5 of which has a specific strength can be obtained, thereby the wire 2 of the wiring harness 3 can have a predetermined strength. Therefore, the quality of the wiring harness 3 can be maintained.

In the wire-crosslinking device 21, the wire 2 is tied up to the pair of the rollers 40*a* and 40*b* with the wire's sleeves tucked up inside the box 39 and an electron beam is irradiated onto the wires 2 situated at the center between the pair of the rollers 40*a* and 40*b*. Therefore, by using only one electron gun 41, an electron beam can securely be irradiated onto both sides 2*b* and 2*c* of the wire 2. Accordingly, the size of the wire-crosslinking device 21 can be reduced and a space for installing the order-receiving production system 1 of the wiring harness 3 and a space for installing the order-receiving production system 1*a* of the wire 2 can be reduced.

If the wire 2 produced after receiving an order has non-color, the wire 2 can securely be colored with a desired color.

Further, the respective departments 44, 45 and 46 forward the respective first, second and third confirmation data DK1, DK2 and DK3 to the production control department 16. The wire-producing department 14 forwards the fourth confirmation data DK4 to the production control department 16. The wiring harness-producing department 15 forwards the fifth confirmation data DK5 to the production control department 16. Therefore, the production control department 16 can have a clear grasp of the progress in the producing and assembling works of the wiring harness 3 or wire 2. Since the production control department 16 forwards the data DK5 to the wiring harness order-placing department 43, the wiring harness order-placing department 43 can confirm the date of delivery and so on.

The wire-producing department 14 receives the data DK1, DK2 and DK3. Therefore, the wire-producing department 14 can securely compute the data DK4. Since the data DK4 is forwarded to the wiring harness-assembling department 15, the wiring harness-assembling department 15 can securely compute the data DK5.

Figure 10:
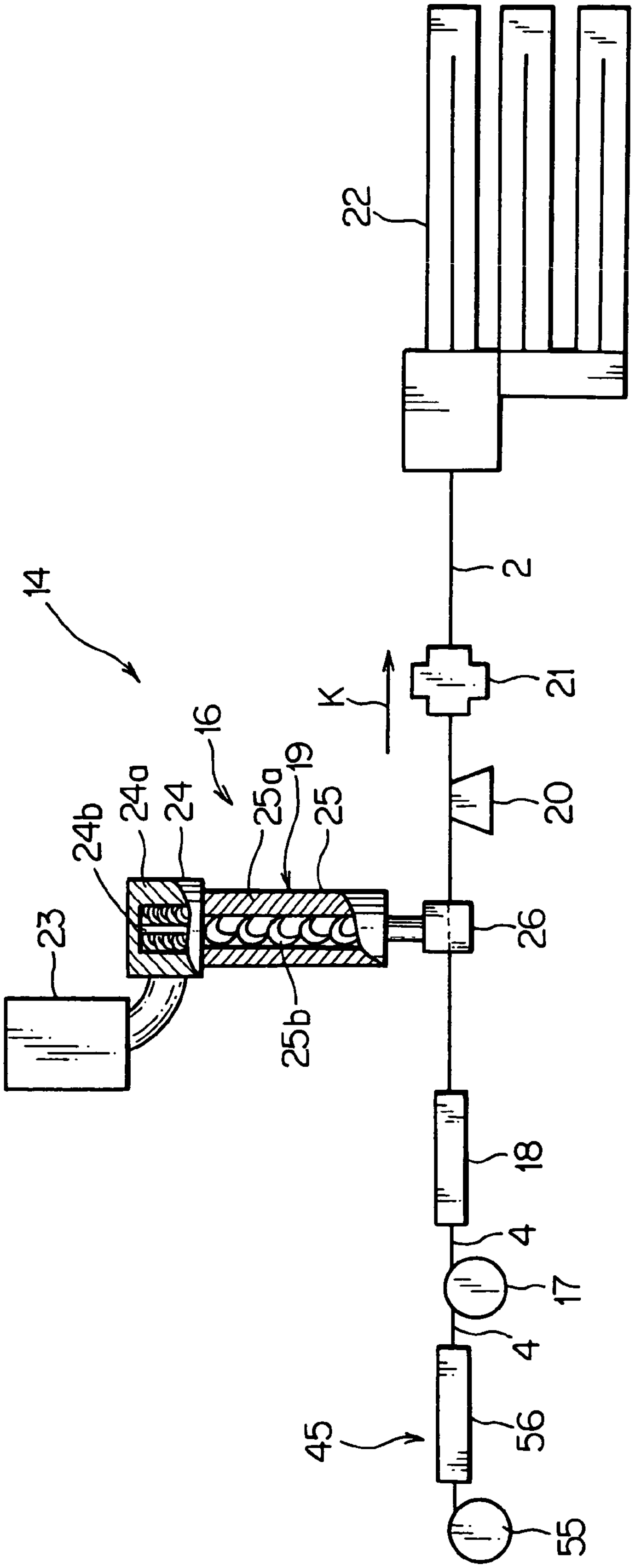
FIG. 10 shows a construction of a modified example of the wire-producing department shown in FIG. 6.

In the preferred embodiment described above, the wire-producing department 14 is separated from the core wire-producing department 45. However, as shown in FIG. 10, the wire-producing department 14 may be included in the core wire-producing department 45.

The core wire-producing department 45 includes the copper wire-supplying unit 55 and thin wire/twisted wire unit 56. The copper wire-supplying unit 55 supplies the copper wire transferred from the copper wire-producing department 47. The thin wire/twisted wire unit 56 forms the copper wire supplied by the copper wire-supplying unit 55 thin, twists these thin copper wires so as to produce the core wire 4, and transfers the twisted wires to the core wire-supplying unit 17. Even in a case as shown in FIG. 10, the wire 2 is produced after receiving an order of the wiring harness 3, i.e. of the wire 2. In the case as shown in FIG. 10, the copper wire-producing department 47 corresponds to the second producing department and the copper wire amount data DD corresponds to the second ordered quantity data.

In the preferred embodiment described above, the coloring device 20 and the crosslinking unit 21 is included in the wire-producing department 14. However, the coloring device 20 and the crosslinking unit 21 may be included in the wiring harness-assembling department 15. Thus, in the present invention, the coloring device 20 and the crosslinking unit 21 may be included in at least one of the wire-producing department 14 and the wiring harness-assembling department 15.

In the preferred embodiment described above, the coloring device 20 colors a part of the outer surface 5*a* of the wire 2 by spouting a coloring agent with a specific amount. However, instead, the wire 2 may be dipped in a coloring agent, or alternatively, a coloring agent may be sprayed onto the whole outer surface 5*a* of the wire 2 so as to color the whole outer surface 5*a*.

In the preferred embodiment described above, the wire 2 of the wiring harness 3 to be arranged in a motor vehicle is described. However, the wire 2 to be produced by using the method according to the present invention can be applied not only to a motor vehicle but also to various electronic equipment such as a portable computer or various electric machines.

As the coloring means for coloring the wire 2, various measures such as dipping, spraying, spouting, printing and transcribing may be used. As the coloring agent and coating formulations, various materials such as acrylic coating formulations, ink (dye ink or pigment ink) and ultraviolet ink may be used.

In the present invention, the production control department 16, resin-producing department 44, core wire-producing department 45, additive-producing department 46, copper wire-producing department 47, wire-producing department 14 and wiring harness-assembling department 15 may belong to the same organization, or alternatively, may belong to the respective different organization. Alternatively, at least two departments of the production control department 16, resin-producing department 44, core wire-producing department 45, additive-producing department 46, copper wire-producing department 47, wire-producing department 14 and wiring harness-assembling department 15 may belong to the same organization. That is, the order-receiving production system 1 of a wiring harness consisting of the production control department 16, resin-producing department 44, core wire-producing department 45, additive-producing department 46, copper wire-producing department 47, wire-producing department 14 and wiring harness-assembling department 15 may belong to a plurality of organizations, or alternatively, may belong to one organization.

The aforementioned preferred embodiments are described to aid in understanding the present invention and variations may be made by one skilled in the art without departing from the spirit and scope of the present invention.

INDUSTRIAL APPLICABILITY

As explained above, according to the invention, since the mixture of the pellets and the additive is extruded onto the circumference of the core wire while simultaneously mixing the pellets and the additive so that the core wire is coated with the mixture, a period of time required to produce the wire can be shorter than that in a case in which the pellets and the additive are mixed by a compounder. Therefore, even if the wire is produced after receiving an order of the wire, the wire can be produced in a desired period of time. Further, since the wire is produced after receiving an order of the wire, an amount of the wire to be stocked in advance can be controlled.

Therefore, a space for stocking the wires in advance can be reduced and a space for storing the wire during the production of the wire also can be reduced, thereby preventing the cost of the wire and the product using the wire from increasing. Further, the wire having a necessary length is produced after receiving an order of the wire, therefore an excess portion of the wire is never produced, thereby the resource-saving can be attained.

According to the invention, since an outer surface of the wire, which is produced after receiving an order of the wire, is monochromatic, therefore the production efficiency of the wire can be prevented from deteriorating and the types (i.e. types in color) of the wire to be stocked in advance can be controlled. Therefore, a space for stocking the wires in advance can be reduced and a space for storing the wire during the production of the wire also can be reduced, thereby preventing the cost of the wire and the product using the wire from increasing.

According to the present invention, the outer surface of the wire produced is colored with a desired color to obtain the wire having the desired color.

According to the present invention, the wire produced is further crosslinked so as to obtain the wire, the coating of which has a specific strength.

According to the present invention, since the mixture of the pellets and the additive is extruded onto the circumference of the core wire while simultaneously mixing the pellets and the additive so that the core wire is coated with the mixture, a period of time required to produce the wire can be shorter than that in a case in which the pellets and the additive are mixed by a compounder. Therefore, even if the wire is produced after receiving an order of the wiring harness, the wire can be produced in a desired period of time so as to assemble the wiring harness. Further, since the wire is produced after receiving an order of the wiring harness, an amount of the wire to be stocked in advance can be controlled.

Therefore, a space for stocking the wires in advance can be reduced and a space for storing the wire during the production of the wire also can be reduced, thereby preventing the cost of the wire and the product using the wire from increasing. Further, the wire having a necessary length is produced after receiving an order of the wire, therefore an excess portion of the wire is never produced, thereby the resource-saving can be attained.

According to the present invention, since an outer surface of the wire, which is produced after receiving an order of the wiring harness, is monochromatic, therefore the production efficiency of the wire can be prevented from deteriorating and the types (i.e. types in color) of the wire to be stocked in advance can be controlled. Therefore, a space for stocking the wires in advance can be reduced and a space for storing the wire during the production of the wire also can be reduced, thereby preventing the cost of the wire and the wiring harness using the wire from increasing.

According to the present invention, the outer surface of the wire produced is colored with a desired color to obtain the wire having the desired color. Then, the part is attached to the colored wire so as to assemble the wiring harness. Since the wire colored with various colors can be obtained, one wire can be distinguished from another wire, thereby preventing an error in wiring the wires from occurring. Therefore, the quality of the wiring harness can be prevented from deteriorating.

According to the present invention, the wire produced is further crosslinked so as to obtain the wire, the coating of which has a specific strength. Therefore, the wire in the wiring harness can have a predetermined strength. Therefore, the quality of the wiring harness can be maintained.

According to the present invention, the production control department forwards a first ordered quantity data indicating a necessary amount of the pellets, second ordered quantity data indicating a necessary amount of the core wire and third ordered quantity data indicating a necessary amount of the additive, each corresponding to the received order of the wire, to a first producing department, second producing department and third producing department, respectively. Therefore, after receiving the order of the wire, a necessary amount of the starting materials of the wire can securely be gathered.

Further, since wire-producing department extrudes the mixture of the pellets and the additive onto the circumference of the core wire while simultaneously mixing the pellets and the additive so that the core wire is coated with the mixture, a period of time required to produce the wire can be shorter than that in a case in which the pellets and the additive are mixed by a compounder. Therefore, even if the wire is produced after receiving an order of the wire, the wire can be produced in a desired period of time. Further, since the wire is produced after receiving an order of the wire, an amount of the wire to be stocked in advance can be controlled.

Therefore, a space for stocking the wires in advance can be reduced and a space for storing the wire during the production of the wire also can be reduced, thereby preventing the cost of the wire and the product using the wire from increasing. Further, the wire having a necessary length is produced after receiving an order of the wire, therefore an excess portion of the wire is never produced, thereby the resource-saving can be attained.

According to the invention, since an outer surface of the wire, which is produced after receiving an order of the wire, is monochromatic, therefore the production efficiency of the wire can be prevented from deteriorating and the types (i.e. types in color) of the wire to be stocked in advance can be controlled. Therefore, a space for stocking the wires in advance can be reduced and a space for storing the wire during the production of the wire also can be reduced, thereby preventing the cost of the wire and the product using the wire from increasing.

According to the present invention, the system further comprises a coloring device for coloring the outer surface of the wire produced with a desired color. Therefore, the wire having the desired color can be obtained.

According to the present invention, the system further comprises a crosslinking device for crosslinking the wire so as to obtain the wire, the coating of which has a specific strength.

According to the present invention, in the wire-crosslinking device, the wire is tied up to the pair of the rollers with the wire's sleeves tucked up inside the box and an electron beam is irradiated onto the wires situated at the center between the pair of the rollers. Therefore, by using only one irradiation unit, an electron beam can securely be irradiated onto both sides of the wire. Accordingly, the size of the wire-crosslinking device can be reduced and a space for the order-receiving production system can be reduced.

According to the present invention, the production control department forwards a first ordered quantity data indicating a necessary amount of the pellets, second ordered quantity data indicating a necessary amount of the core wire and third ordered quantity data indicating a necessary amount of the additive, each corresponding to the received order of the wire, to a first producing department, second producing department and third producing department, respectively. Therefore, after receiving the order of the wire, a necessary amount of the starting materials of the wire can securely be gathered.

Further, since wire-producing department extrudes the mixture of the pellets and the additive onto the circumference of the core wire while simultaneously mixing the pellets and the additive so that the core wire is coated with the mixture, a period of time required to produce the wire can be shorter than that in a case in which the pellets and the additive are mixed by a compounder. The wiring harness-assembling department attaches a desired component to the wire produced by the wire-producing department, thereby assembling a wiring harness.

Therefore, even if the wire is produced after receiving an order of the wiring harness, the wire can be produced in a desired period of time so as to assemble the wiring harness. Further, since the wire is produced after receiving an order of the wiring harness, an amount of the wire to be stocked in advance can be controlled.

Therefore, a space for stocking the wires in advance can be reduced and a space for storing the wire during the production of the wire also can be reduced, thereby preventing the cost of the wire and the product using the wire from increasing. Further, the wire having a necessary length is produced after receiving an order of the wire, therefore an excess portion of the wire is never produced, thereby the resource-saving can be attained.

According to the present invention, since an outer surface of the wire, which is produced after receiving an order of the wiring harness, is monochromatic, therefore the production efficiency of the wire can be prevented from deteriorating and the types (i.e. types in color) of the wire to be stocked in advance can be controlled. Therefore, a space for stocking the wires in advance can be reduced and a space for storing the wire during the production of the wire also can be reduced, thereby preventing the cost of the wire and the wiring harness using the wire from increasing.

According to the present invention, at least one of the wire-producing department and the wiring harness-assembling department comprises a coloring device for coloring the outer surface of the wire produced with a desired color. Therefore, the wire having the desired color can be obtained. Then, the part is attached to the colored wire so as to assemble the wiring harness. Since the wire colored with various colors can be obtained, one wire can be distinguished from another wire, thereby preventing an error in wiring the wires from occurring. Therefore, the quality of the wiring harness can be prevented from deteriorating.

According to the present invention, the system further comprises a crosslinking device for crosslinking the wire so as to obtain the wire, the coating of which has a specific strength. Therefore, the wire in the wiring harness can have a predetermined strength. Therefore, the quality of the wiring harness can be prevented from deteriorating.

According to the present invention, in the wire-crosslinking device, the wire is tied up to the pair of the rollers with the wire's sleeves tucked up inside the box and an electron beam is irradiated onto the wires situated at the center between the pair of the rollers. Therefore, by using only one irradiation unit, an electron beam can securely be irradiated onto both sides of the wire. Therefore, by using only one irradiation unit, an electron beam can securely be irradiated onto both sides of the wire. Accordingly, the size of the wire-crosslinking device can be reduced and a space for the order-receiving production system can be reduced.

According to the present invention, in the wire-crosslinking device, the wire is tied up to the pair of the rollers with the wire's sleeves tucked up inside the box and an electron beam is irradiated onto the wires situated at the center between the pair of the rollers. Therefore, by using only one irradiation unit, an electron beam can securely be irradiated onto both sides of the wire. Accordingly, the size of the wire-crosslinking device can be reduced.

The invention claimed is:

1. An order-receiving production system of a wire comprising:

a wire-producing department for producing the wire;

a production control department for controlling the wire-producing department and receiving an order of the wire;

a first producing department for producing a pellet;

a second producing department for producing a core wire; and a third producing department for producing an additive, wherein the production control department: computes a first ordered quantity data indicating an amount of the pellet of synthetic resin for constituting a coating of the wire corresponding to the amount of the received order forwarded from an order-placing department and forwards the first ordered quantity data to the first producing department;

computes a second ordered quantity data indicating an amount of the core wire corresponding to the amount of the received order forwarded from the order-placing department and forwards the second ordered quantity data to the second producing department; and computes a third ordered quantity data indicating an amount of the additive to be added to the synthetic resin corresponding to the amount of the received order forwarded from the order-placing department and forwards the third ordered quantity data to the third producing department, the first, second and third producing departments produce the pellet, core wire and additive to the amount corresponding to the first, second and third ordered quantity data, respectively, and send the produced pellet, core wire and additive, respectively, to the wire-producing department, and the wire-producing department extrudes a mixture of the pellets sent from the first producing department and the additive sent from the third producing department onto the circumference of the core wire sent from the second producing department while simultaneously mixing the pellets and the additive so that the core wire is coated with the mixture, thereby producing the wire having a necessary length.

2. The order-receiving production system of a wire according to claim 1, wherein an outer surface of the wire produced is monochromatic.

3. The order-receiving production system of a wire according to claim 2, further comprising a coloring device for coloring the outer surface of the wire produced with a desired color.

4. The order-receiving production system of a wire according to claim 1, further comprising a wire-crosslinking device for crosslinking the wire produced.

5. The order-receiving production system of a wire according to claim 4, wherein the wire-crosslinking device comprises:

an enclosed box including a pair of wire-guiding parts through which the wire passes;

an irradiation unit for irradiating an electron beam onto the wires which pass through the interior of the box, and a pair of rollers having a distance therebetween disposed rotatably in the box, wherein the wire is guided into the box through one wire-guiding part, in the box the wire comes in contact with an outer circumferential surface of one roller located near to the one wire-guiding part and comes in contact with an outer circumferential surface of an opposite roller, and the wire again comes in contact with an outer circumferential surface of the one roller, thereby the wire is tied up to the pair of the rollers with the wire's sleeves tucked up and the wire is guided out from the box through an opposite wire-guiding part, and the irradiation unit irradiates an electron beam onto the wires situated at the center between the pair of the rollers.

6. An order-receiving production system of a wiring harness comprising:

a wire-producing department for producing a wire:

a wiring harness-assembling department for assembling a wiring harness by using the wire produced by the wire-producing department;

a production control department for controlling the wire-producing department and the wiring harness-assembling department, and receiving an order of the wiring harness; a first producing department for producing a pellet;

a second producing department for producing a core wire; and a third producing department for producing an additive, a third producing department for producing an additive, wherein the production control department: computes a first ordered quantity data indicating an amount of the pellet of synthetic resin for constituting a coating of the wire corresponding to the amount of the received order forwarded from an order-placing department and forwards the first ordered quantity data to the first producing department;

computed a second ordered quantity data indicating an amount of the core wire corresponding to the amount of the received order forwarded from the order-placing department and forwards the second ordered quantity data to the second producing department; and computes a third ordered quantity data indicating an amount of the additive to be added to the synthetic resin corresponding to the amount of the received order forwarded from the order-placing department and forwards the third ordered quantity data to the third producing department, the first, second and third producing departments produce the pellet, core wire and additive to the amount corresponding to the first, second and third ordered quantity data, respectively, and send the produced pellet, core wire and additive, respectively, to the wire-producing department, and the wire-producing department extrudes a mixture of the pellets sent from the first producing department and the additive sent from the third producing department onto the circumference of the core wire sent from the second producing department while simultaneously mixing the pellets and the additive so that the core wire is coated with the mixture, thereby producing the wire having a necessary length, and sends the wire produced to the wiring harness-assembling department, and the wiring harness-assembling department attached a desired component to the wire produced by the wire-producing department, thereby assembling a wiring harness.

7. The order-receiving production system of a wiring harness according to claim 6, wherein an outer surface of the wire produced is monochromatic.

8. The order-receiving production system of a wiring harness according to claim 7, wherein at least one of the wire-producing department and the wiring harness-assembling department comprises a coloring device for coloring the outer surface of the wire produced with a desired color.

9. The order-receiving production system of a wiring harness according to claim 6, wherein at least one of the wire-producing department and the wiring harness-assembling department comprises a wire-crosslinking device for crosslinking the wire produced.

10. The order-receiving production system of a wiring harness according to claim 9, wherein the wire-crosslinking device comprises:

an enclosed box including a pair of wire-guiding parts through which the wire passes;

an irradiation unit for irradiating an electron beam onto the wires which pass through the interior of the box; and a pair of rollers arranged having a distance therebetween disposed rotatably in the box, wherein the wire is guided into the Dox through one wire-guiding part, in the box the wire comes in contact with an outer circumferential surface of one roller located near to the one wire-guiding part and comes in contact with an outer circumferential surface of an opposite roller, and the wire again comes in contact with an outer circumferential surface of the one roller, thereby the wire is tied up to the pair of the rollers with the wire's sleeves tucked up and the wire is guided out from the box through an opposite wire-guiding part, and the irradiation unit irradiates an electron beam onto the wires situated at the center between the pair of the rollers.

* * * * *